United States Patent [19]

Callison et al.

[11] Patent Number: 5,737,744

[45] Date of Patent: Apr. 7, 1998

[54] DISK ARRAY CONTROLLER FOR PERFORMING EXCLUSIVE OR OPERATIONS

[75] Inventors: Ryan A. Callison, Spring; Gary F. Chard, Tomball, both of Tex.

[73] Assignee: Compaq Computer Corporation, Houston, Tex.

[21] Appl. No.: 542,709

[22] Filed: Oct. 13, 1995

[51] Int. Cl.$^6$ .................................................. G06F 12/16
[52] U.S. Cl. ................ 711/114; 395/182.04; 364/DIG. 1
[58] Field of Search ........................... 395/182.04, 404, 395/275, 441; 371/49.1

[56] References Cited

U.S. PATENT DOCUMENTS

| | | |
|---|---|---|
| 5,101,492 | 3/1992 | Schultz. |
| 5,206,943 | 4/1993 | Callison. |
| 5,243,699 | 9/1993 | Nickolls et al. ................ 395/275 |
| 5,388,108 | 2/1995 | DeMoss ......................... 395/182.04 |
| 5,408,644 | 4/1995 | Schneider. |
| 5,469,566 | 11/1995 | Hohenstein et al. ............ 395/182.04 |
| 5,473,761 | 12/1995 | Parks et al. ...................... 395/404 |
| 5,522,032 | 5/1996 | Franaszek ....................... 395/182.04 |
| 5,522,065 | 5/1996 | Neufeld .......................... 395/182.04 |
| 5,613,059 | 3/1997 | Stallmo et al. ................. 395/182.04 |
| 5,623,595 | 4/1997 | Bailey ............................. 395/182.04 |

OTHER PUBLICATIONS

David A. Patterson, et al., "A Case for Redundant Arrays of Inexpensive Disks (RAID), Report No. UCB/CSD 87/391, Dec. 1987.

*Primary Examiner*—Tod R. Swann
*Assistant Examiner*—David C. Langjahr
*Attorney, Agent, or Firm*—Pravel, Hewitt, Kimball & Krieger

[57] ABSTRACT

Circuitry for performing hardware assisted XOR operations to generate parity bits for a disk array system. The circuitry includes a controller that acts as an interface between a PCI bus and a DRAM that includes a write-posting cache portion and an XOR buffer portion. The DRAM has a maximum data storage capacity, and the controller is allocated an address space that is twice the maximum storage capacity of the DRAM. The address space is divided into two portions, a normal address range and an XOR address range. A write to the normal address range produces a normal write cycle to the DRAM, while a write to the XOR address range generates a read-modify-write XOR cycle to the DRAM. In the read-modify-write XOR cycles, the read data are XORed with the write data. Selected data are cumulatively XORed to generate new parity information.

33 Claims, 11 Drawing Sheets

| A | B | C | D | P1 |
|---|---|---|---|----|
| E | F | G | H | P2 |
| I | J | K | L | P3 |
| M | N | P | Q | P4 |
| R | S | T | U | P5 |
| ⋮ | ⋮ | ⋮ | ⋮ | ⋮ |

*FIG. 2*

| A  | B  | C  | D  | P1 |
|----|----|----|----|----|
| E  | F  | G  | P2 | H  |
| I  | J  | P3 | K  | L  |
| M  | P4 | N  | P  | Q  |
| P5 | R  | S  | T  | U  |
| ⋮  | ⋮  | ⋮  | ⋮  | ⋮  |

*FIG. 3*

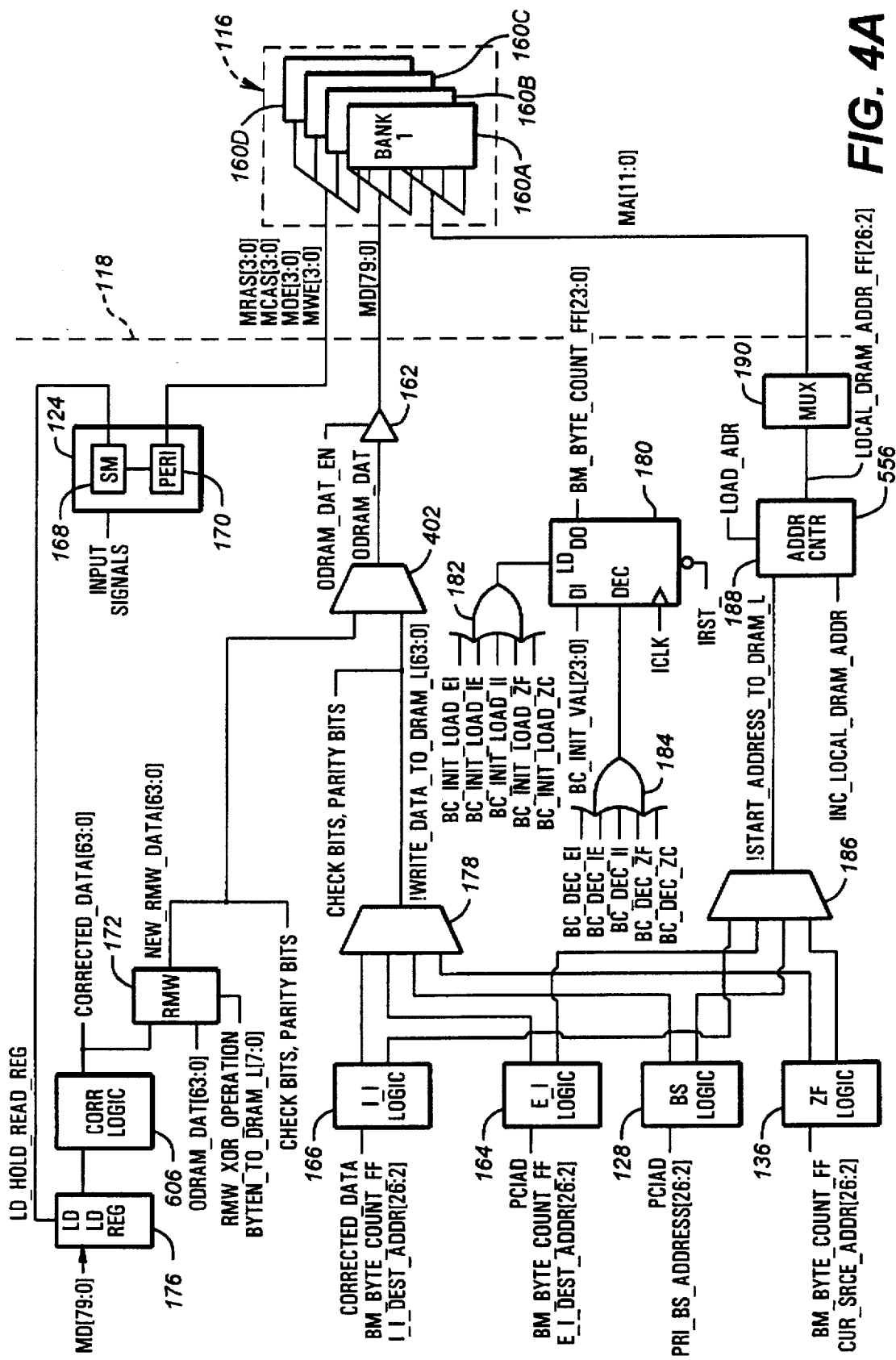

DISK ARRAY CONTROLLER FOR PERFORMING EXCLUSIVE OR OPERATIONS

BACKGROUND OF THE INVENTION

1. Field of the Invention

The invention relates to disk array controllers, and more particularly, to disk array controllers that perform a normal write when writing to a first address range and perform a read-modify-write exclusive OR operation when writing to a second address range.

2. Description of the Related Art

With the proliferation of low cost personal computers, local area networks (LANs) have become very popular as communications networks that connect relatively large numbers of personal computers or workstations. A LAN typically includes one or more file servers, which act as storage hubs for data, with copies of the data being transferred to the workstations on demand and updated data being returned for storage.

To achieve the optimal price/performance ratio, file servers are implemented with a collection of relatively smaller and inexpensive hard disk drives. However, with the increased number of disk drives used, the failure rate increases dramatically. Several solutions to the data failure problem are available. The simplest solution is to provide completely redundant disk drives, which is referred to as mirroring. One problem with mirroring is storage efficiency, as one half of the available capacity is used for redundancy. Other more efficient solutions have been proposed, such as those in David E. Paterson et al., "A Case for Redundant Arrays of Inexpensive Disks (RAID)," Report No. UCB/CSD 87/391 (Dec. 1987). Various RAID protection schemes are described. The RAID 1 architecture refers to the traditional mirrored disk approach. In the RAID 4 architecture, parity disks are used for storing parity information which are used to check for errors in accessed data. The RAID 5 architecture is an improvement on the RAID 4 architecture, with the parity information distributed across all the disks to achieve greater parallelism.

U.S. Pat. No. 5,206,943, entitled "Disk Array Controller with Parity Capabilities," to Callison et al., describes an XOR or parity engine used to develop parity information used with a disk array without requiring computations by the local processor on the disk array controller. The Callison system includes a transfer controller that operates as a direct memory access (DMA) controller having four main channels. One of the channels is subdivided into four subchannels, one of which includes the XOR engine. The XOR engine successively brings data from each of the desired channels into the parity channel to cumulatively develop the parity information. Data, including the parity information, which are transferred between the host system and the disk array are contained in a transfer buffer RAM. Transfer of data to and from the transfer RAM is controlled by the transfer controller, which is in turn controlled by the local processor.

To improve data transfer throughput, U.S. Pat. No. 5,408,644, entitled "Method and Apparatus for Improving the Performance of Partial Stripe Operations in a Disk Array Subsystem," to Schneider et al., describes use of a write posting cache. Schneider also utilizes an XOR engine to develop parity information independent of the local processor. When a host such as a processor or bus master performs a write operation to the disk array, and the write posting cache is not full, the write data is written into the cache, and the posting cache immediately returns a ready signal to the host. Since the access time of the write posting cache is much better than that of the disk subsystem, overall system performance is improved.

In the systems used above, transfers between the transfer buffer RAM and the disk drive array are developed by having the local processor appropriately programming the transfer controller, which includes the parity engine. Various resources, such as I/O space address and DMA channels, must be allocated to the parity engine in the transfer controller for proper operation. This requires valuable process time and so increases overhead burdens and program complexity. Furthermore, the size of the transfer RAM limits the amount of data that can be stored for generation of the parity information because separate buffer areas must be allocated to the parity information and the data.

Therefore, it is desired that a parity generation system be developed that avoids the limitations described above.

SUMMARY OF THE PRESENT INVENTION

A disk controller according to the present invention performs hardware assisted exclusive OR (XOR) operations to generate parity bits associated with the fault tolerance scheme used by a disk array system. The disk controller is allocated a memory address space which includes an XOR address range and a normal address range. Writes addressed to the normal address space cause the disk controller to generate normal writes, whereas writes to the XOR address space cause the disk controller to perform read-modify-write XOR cycles. An XOR buffer of variable size can be defined in the disk controller memory. Additionally, a write posting cache can be allocated in the memory to improve data throughput for host computer writes to the disk subsystem. In performing the read-modify-write XOR cycles, data is read from the XOR buffer and XORed with the write data, with the result being placed back into the XOR buffer.

Writes can be of various lengths. To generate the new parity information for write data, a portion of the XOR buffer that is equal to the specified transfer length is initially filled with zeros. Next, the new write data is written to the XOR buffer in the XOR address range, which results in the new write data being XORed with zeros. Next, the original data at the locations specified in the data write operation are retrieved from the disk subsystem, as are the original parity information. The original data and original parity information are written to the XOR buffer in the XOR address range, causing the original data and original parity information to be XORed with the data in the XOR buffer to ultimately generate the new parity information.

One advantage offered by the disk controller according to the present invention is that parity information can be generated by hardware without having to allocate additional I/O or DMA resources to the hardware. Another advantage is that the size of the XOR buffer can be adjusted by the user to fit different transfer lengths. A further advantage is that the read-modify-write XOR operation can be used in operations other than parity generation.

BRIEF DESCRIPTION OF THE DRAWINGS

A better understanding of the present invention can be obtained when the following detailed description of the preferred embodiment is considered in conjunction with the following drawings, in which:

FIGS. 2 and 3 illustrate how parity information is stored in the RAID 4 and RAID 5 fault tolerant schemes;

FIG. 4A is a block diagram of a memory interface on the disk controller board of FIG. 1;

DETAILED DESCRIPTION OF THE PREFERRED EMBODIMENT

Figure 1:
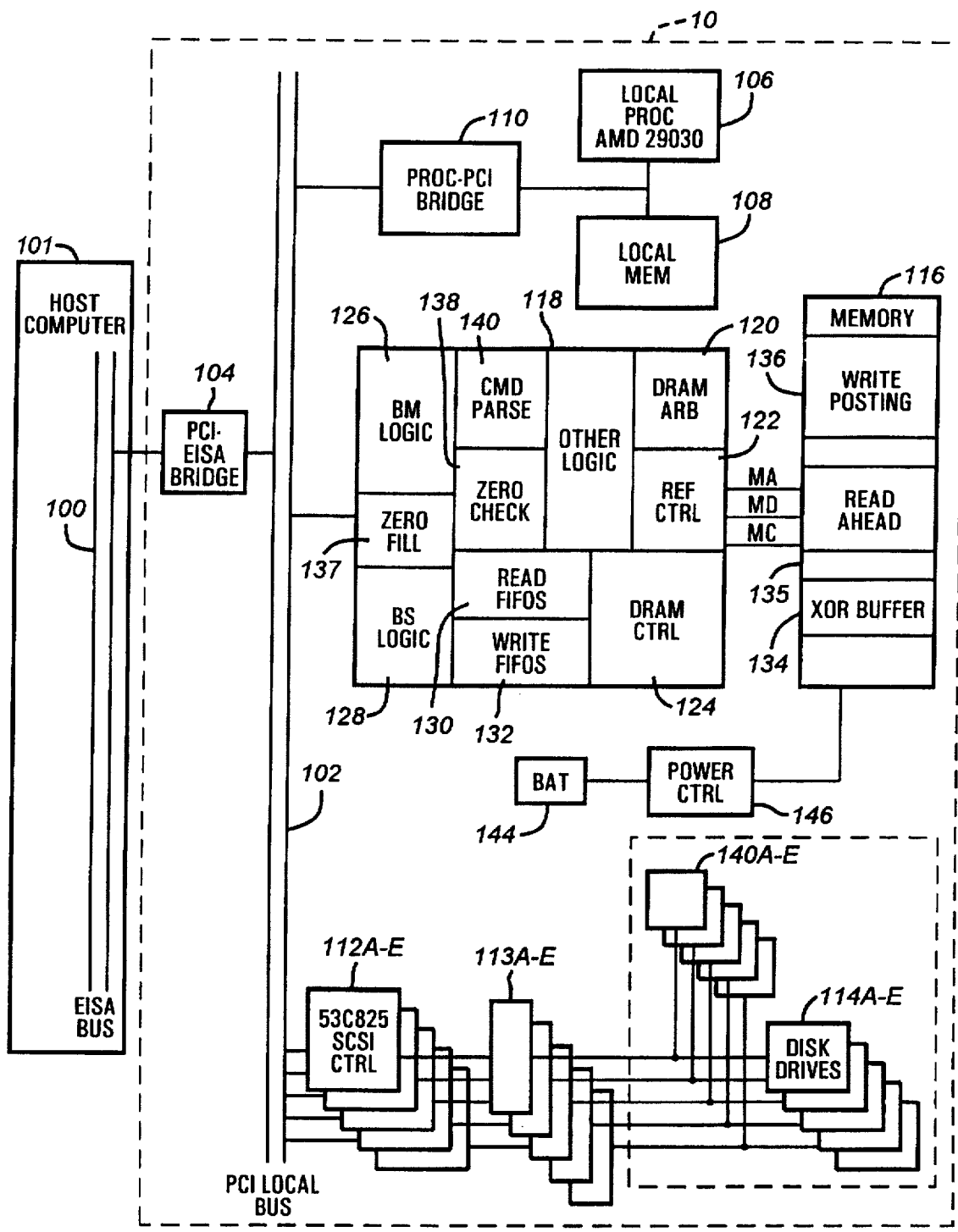
FIG. 1 is a block diagram of a disk controller board according to the present invention.

Referring now to FIG. 1, a block diagram of the disk controller 10 according to the present invention is shown. The disk controller board 10 is connected either to an EISA bus or a PCI bus 100, which provides the communications channel to the other components of a host computer system. For purposes of the remaining discussion, an EISA bus 100 will be used. The disk controller board 10 includes a PCI local bus 102, which includes a control portion and a multiplexed address and data portion. For a description of the PCI bus standard, refer to *PCI Specification, Revision 2.0*, Intel Corporation (April, 1993), which is hereby incorporated by reference.

A PCI-EISA bridge 104 is connected between the EISA bus 100 and the PCI local bus 102. If, however, a PCI bus 100 is used instead, then a PCI-PCI bridge 104 would be used. The PCI-EISA bridge 104 is both a master and slave device on both the PCI bus 102 and the EISA bus 100 and functions as a buffer, a translation unit and a PCI arbiter. The bridge 104 contains a number of FIFOs for optimizing data transfers from EISA slaves to PCI bus masters. On the EISA side, data transfers are controlled by the bridge EISA bus master. On the PCI side, data transfers are handled by the PCI slave logic. Each PCI bus master communicating with the bridge 104 is allocated a FIFO. Therefore, a PCI master could be reading from one FIFO while a FIFO for another PCI master is being written by the bridge EISA bus master. During a disk read operation, a PCI master will write data into the bridge FIFO for subsequent retrieval by the bridge EISA bus master controller. During a disk write operation, a PCI master will read data from host memory and the bridge EISA bus master controller will read ahead to keep the FIFOs filled, thus enabling long burst reads. More detail on the operation of the FIFOs is provided in patent application Ser. No. 08/542,311, entitled "Read-Ahead FIFO with LRU Replacement Policy," filed concurrently herewith and hereby incorporated by reference. The bridge 104 also contains logic for translating interrupts from the PCI bus to the EISA bus and masking the interrupts until data clears the FIFOs.

The disk controller board 10 also includes a local processor 106, preferably an AMD 29030 processor, that controls the functions of the disk controller board 10. The local processor 106 is connected to a local memory 108, and both the local processor 106 and local memory 108 are connected through a processor-PCI bridge 110 to the PCI local bus 102. The local processor 106 executes firmware stored in the local memory 108 to perform various disk controller functions.

Preferably, the processor-PCI bridge 110 is implemented with an ASIC. The processor-PCI bridge 110 includes logic for converting processor memory or I/O cycles into PCI cycles, as well as processor-to-PCI write posting buffers. The bridge 110 also includes a DRAM controller for controlling operations to the local memory 108. Additionally, interval timers and an interrupt controller are included in the bridge 110.

Also connected to the PCI local bus 102 are a plurality of SCSI controllers 112A–E for interfacing a disk array subsystem 142 that includes a plurality of hard disk drives. The preferred embodiment is configurable to include up to 5 SCSI controllers 112A–E, which are preferably 53C825 PCI-SCSI I/O processors from NCR Corporation. For a full description of the 53C825 SCSI controller, refer to NCR 53C825 PCI-SCSI I/O Processor With Local ROM Interface, Data Manual, NCR Corp. (1993).

Each of the SCSI controllers 112A–E are connected to one of five sets of disk drives 114A–E through connectors 113A–E. Each SCSI controller 112 is preferably capable of being connected to five internal SCSI hard disk drives or seven external SCSI hard disk drives. Each set of drives 114A–E is associated with a microcontroller 140A, B, C, D or E. The microcontrollers 140A–E are preferably implemented with the 8051 processor from Intel Corp. The microcontrollers 104A–E provide certain miscellaneous control functions for each set of drives, such as driving status LED's and performing temperature monitoring. For an examplary microncontroller see application Ser. No. 07/955,669, entitled "Method of Communicating with a SCSI Bus Drvice That Does Not Have an Assigned SCSI Address", filed Oct. 2, 1992 and hereby incorporated by reference. Communications between the SCSI controllers 112A–E and the physical drives 114A–E are accomplished via SCSI buses.

Requests issued by the host computer system are transmitted to the processor-PCI bridge 110. Pointers are written into the processor-PCI bridge 110, which responds by retrieving the commands from the location in host memory specified by the pointers. The processor-PCI bridge 110 then interrupts the local processor to indicate that host requests are available. In response, the local processor 106 builds a command list to perform the requested commands. Depending on the type of operation, the local processor 106 sends command description blocks (CDBs) to the DRAM interface 118 or one of the SCSI controllers 110A–E. In response, the DRAM interface 118 or SCSI controller 112 obtains control of the PCI bus 102 to perform the requested operation.

A posting memory 116, preferably implemented with DRAM chips, is used as a posted write buffer for the host computer system as well as a read ahead cache. The DRAM 116 is connected via a memory data bus MD, memory controller bus MC, and memory address bus MA to a DRAM interface 118, which is in turn connected to the PCI local bus 102. Preferably, the DRAM 116 is configurable to store up to 64 Mbytes of data. By posting writes in the DRAM 116, latencies associated with writing data to the hard disk subsystem 142 are avoided, which improves data transfer throughput. To prevent loss of data in case of power failure, portions of the DRAM 116 are battery backed. Battery backing is necessary as the host computer system has already assumed that the data has been permanently stored in the hard disk drives 114A–E. By battery-backing the DRAM 116, data can be recovered from the DRAM 116 after power is restored to the computer system. Backup power is provided by a power control circuit 146 connected to lithium batteries 144. When power from the host computer system is lost, the power control circuit 146 switches the power supply voltage inputs of the DRAM 116 to the batteries 144. The readahead caching allows improved performance when sequential operations are occurring. More details on the read ahead caching are provided in patent application Ser. No. 08/543,067, entitled "Adaptive Read-Ahead Disk Cache," filed concurrently herewith, which is hereby incorporated by reference.

The DRAM interface 118 supports various configurations of the DRAM 116. Preferably, the DRAM 116 has a maximum capacity of 64 Mbytes, with the DRAM interface 118 being allocated 128 Mbytes, half of which is the normal address range and the other half of which is the XOR address range. The width of the memory data bus MD between the DRAM interface 118 and the DRAM 116 is selectable to either 32 bits or 64 bits. In addition, up to four banks of memory can be used. Preferably, three types of memory chips are used: 256Kx18 DRAM chips for supporting up to 512K bytes of memory capacity; 512x8 or x9 DRAM chips for supporting a total DRAM capacity of 1, 2, 4, 8, 16 or 32 Mbytes; and 2Mx8 DRAM chips for supporting a total memory capacity of 16, 32, 48 or 64 Mbytes. The DRAM interface 118 is configurable to either perform 8-bit error detection and correction (ECC) or parity protection of DRAM data.

For the configurations using the 256Kx18 DRAM chips or 512Kx8 or x9 DRAM chips, address bit 24 distinguishes between the normal address range and the XOR address range. The XOR address range is selected if address bit 24 is set high. In the DRAM configurations using 2Mx8 DRAM chips, address bit 26 distinguishes between read-modify-write XOR operation and normal write operation.

The DRAM 116 can be subdivided into a plurality of portions, including a write posting cache 136, a readahead cache 135 and an XOR buffer 134. The write posting cache 136 receives write posting data during host computer system writes to the hard disk subsystem 142. The write posting cache 136 can also be allocated to store data associated with certain background tasks, such as a rebuild process and an expand process. The rebuild process is invoked to recover data lost when a failed drive is detected, and the expand process is invoked when a reconfiguration of a logical volume is required, such as when a new physical disk drive is inserted into the disk subsystem 142. The rebuild process is described in greater detail in patent application Ser. No. 08/543,011, entitled "Read Checking for Drive Rebuild," and the expand process is described in greater detail in patent application Ser. No. 08/542,897, entitled "On-Line Disk Array Reconfiguration." Both applications are filed concurrently herewith and both are hereby incorporated by reference.

The XOR buffer 134 is used to store data for cumulatively developing the parity information for a particular block of data. The size of the XOR buffer 134 is user-selectable to provide for greater flexibility. The size of the XOR buffer 134 is stored in the local memory 108 as are the sizes of the write posting cache 136 and the read-ahead cache 135. Thus, the local processor 106 is able to keep track of how the DRAM 116 is divided, and the sizes of the various portions can be easily varied. In accordance with the present invention and as will be described in greater detail below, certain operations will cause data to be read from an addressed location in the XOR buffer and exclusive ORed (XORed) with data to be written to the same address. The XORing process is repeated with other data until the desired information is obtained, be it parity values to be stored or data values when data recovery is necessary. Additionally, for the rebuild process, the XOR buffer can be used to perform comparisons of different sectors of data retrieved from unused portions of the hard disk drives to ensure identical characteristic patterns have been stored in those sectors.

Status information regarding the data stored in the write posting cache 136 is stored in the local memory 108. The status information includes a tag, which stores the upper address bits of the data in each cache line as well as information indicating if the cached data is clean or dirty and valid or invalid. The status information further includes information regarding whether the line is locked and the reason for the lock. A line is locked when it is currently being flushed to the disk array 142 or is waiting to receive data from the host. A line can also be locked by other tasks.

Other types of status information in the local memory 108 include the destination of the cached data line, including the logical volume, the drive, and the location in the respective drive. A low priority software task continually scans the status information in the local memory 108 to determine if a line of data contains dirty data and to flush data to the drive array subsystem 142.

The DRAM interface 118 includes a PCI bus master 126 and a PCI bus slave 128. In addition, the DRAM interface 118 includes a DRAM controller 124 for controlling accesses to the DRAM 116, as well as a refresh controller 122 for performing refresh cycles. In the preferred embodiment, the refresh controller 122 runs CAS-before-RAS (CBR) refresh cycles. A DRAM arbiter 120 is also included that arbitrates requests for the DRAM 116 from the various possible requestors in the DRAM interface 118.

The PCI bus slave 128 allows any PCI master, other than the PCI bus master 126 in the DRAM interface 118, to place data directly into the DRAM 116. To improve performance, a set of 5 internal read ahead FIFOs 130 are associated with the PCI bus slave 128, each FIFO having a depth of 8 double words, which is the maximum length of a burst cycle performed by a PCI bus master on the PCI local bus 102. FIFO selection is controlled by a least recently used (LRU) algorithm, which selects the FIFO least recently used. This algorithm is described in more detail in patent application Ser. No. 08/542,311, entitled "Read-Ahead FIFO with LRU Replacement Policy," previously incorporated by reference. Logic for maintaining coherency of the data in the FIFOs 130 is also included. If there is a hit to data located in a particular FIFO, the FIFO selected will be that containing the requested data. The PCI bus slave channel 128 is also associated with a write FIFO 132, which allows posting of writes to the bus slave of up to 8 double words. Use of the write FIFO 132 overcomes the latencies associated with writing data directly into the DRAM 116.

The DRAM arbiter 120 controls all requests to the DRAM 116. In the preferred embodiment, refresh requests are stacked two deep. If two requests are pending, then the CBR refresh request has preemptive priority over any other request for the DRAM 116. A request from the bus slave write FIFO 132 has the next highest priority, followed by a request from the read FIFO bank 130.

The PCI bus master 126 supports three hardware commands essential for drive array operations. The first is a memory-to-memory move, which transfers data from main computer system memory (not shown) to the write posting cache 136 during write posting operations. Additionally, on cache hits to previously posted or read ahead data still residing in the write posting cache 136 or read ahead cache 135, the PCI bus master 126 is programmed to move the data in the write posting cache 136 to system memory. Further, the PCI bus master 126 is also capable of moving data located entirely in the DRAM 116. For example, the internal move may be a transfer of data between the write posting cache 136 and the XOR buffer 134.

The second operation supported by the PCI bus master 126 is a zero fill function, which is used to initialize specified portions of the XOR buffer 134 to all zeros. As will be described in greater detail below, a zero fill operation is first performed before performing the XOR steps needed to generate parity information. The zero fill operation is controlled by a zero fill block 136.

In addition, the PCI bus master 126 supports a zero detect operation, which is used to check disk data integrity of redundant drives. To that end, a zero check block 138 is provided in the DRAM interface 118.

Operations of the PCI bus master 126 in the DRAM interface 118 are controlled by command descriptor blocks (CDB). Software being executed by the local processor 106 places a CDB in a memory location that is accessible by the PCI bus master 126. Pointers to the CDBs are placed in a command pointer FIFO located in the DRAM interface 118 to initiate operation by the bus master 126. The bus master 126 retrieves the CDB pointers from the command pointer FIFO in the order they are stored, fetches the CDB from the memory location specified and executes the command contained in the CDB. Upon completion of the command, the bus master 126 transfers the CDB pointer for the completed command from the command pointer FIFO to a completion status FIFO. The local processor 106 can be notified by interrupt or through polling that either a completion is pending or that the bus master 126 can accept more CDB pointers. To parse the retrieved CDB commands, a command parser block 140 is provided in the DRAM interface 118. As the command parse operation may require access to the DRAM 116, the command parser block 140 is a potential requestor which must be granted access by the DRAM arbiter 120 before it can begin operation.

As described above, the top three priorities for accesses to the DRAM 116 belong to the CBR refresh request, a request from the posted bus slave write FIFO 132, and a request from the read FIFO bank 130. The priorities of the remaining requests are as follows, in descending order: zero check operation, an external-to-internal memory write operation, an internal-to-internal memory read operation, an internal-to-internal memory write operation, a zero fill operation, a command parse operation, and an internal-to-external memory read operation.

A key advantage offered by the disk controller board 10 is that the DRAM interface 118 allows hardware-assisted exclusive OR operations without using a dedicated parity engine with I/O and DMA resource requirements. In the preferred embodiment of the present invention, the amount of memory space allocated to the DRAM interface 118 is double the memory capacity of the DRAM 116. Preferably, double mapping is used in which the normal and XOR address ranges are mapped to the same physical region in the DRAM 116. The DRAM interface 118 monitors the upper bit of the specified address space to determine whether an XOR operation is needed. If the upper bit is set, the DRAM interface performs a read-modify-write XOR cycle to the addressed location, in which the original data stored in that location is XORed with the write data and then placed back in the XOR buffer 134.

The memory map for the DRAM 116 is according to Table 1, which shows the double-mapping scheme according to the preferred embodiment of the present invention.

TABLE 1

| DRAM CONFIGURATION | LOGICAL ADDRESS RANGE | PHYSICAL ADDRESS RANGE IN DRAM |
|---|---|---|
| 2M × 8 | {DRAM_BASE_ADDR [31:27], 00b, 000000h}– | {00b, 000000h}– {11b, 111111h} |
|  | {DRAM_BASE_ADDR [31:27], 011b, 111111h} | NORMAL WRITE |
| 2M × 8 | {DRAM_BASE_ADDR [31:27], 100b, 000000h}– | {00b, 000000h}– {11b, 111111h} |
|  | {DRAM_BASE_ADDR [31:27], 111b, 111111h} | XOR RMW |
| 256K × 18 OR 512K × 8,9 | {DRAM_BASE_ADDR [31:25], 0b, 000000h}– | 000000h–111111h |
|  | {DRAM_BASE_ADDR [31:25], 0b, 111111h} | NORMAL WRITE |
| 256K × 18 OR 512K × 8,9 | {DRAM_BASE_ADDR [31:25], 1b, 000000h}– | 000000h–111111h |
|  | {DRAM_BASE_ADDR [31:25], 1b, 111111h} | XOR RMW |

The value in bits DRAM_BASE_ADDR[31:27] specifies the base address of the DRAM 116 if the DRAM 116 is configured with 2Mx8 DRAM chips. Otherwise, if configured with 256Kx18 or 512Kx8,9 chips, bits DRAM_BASE_ADDR[31:25] specify the base address of the DRAM 116.

In the 2Mx8 configuration, address bit 26 distinguishes between the normal address range and the XOR address range. Note that the same physical DRAM address locations are accessed even though bit 26 is different. For the 256Kx18 or 512Kx8,9 configurations, bit 24 distinguishes between the normal and XOR address range.

In the preferred embodiment, a read to an address in either the normal or XOR address range causes the same physical location in the DRAM 116 to be retrieved. Thus, for read operations, the most significant bit used for distinguishing the normal and XOR address ranges is simply ignored.

In an alternative embodiment, the DRAM interface 118 is programmable to use either single mapping or double mapping. If single mapping is used, then the different address ranges are mapped to different physical regions of the DRAM 116. In the single-mapping scheme, a write to the XOR address range would still result in the generation of read-modify-write XOR cycles. Double mapping would also be available if desired to map the normal address range and XOR address range to the same physical region in the DRAM 116, as discussed above. The programming can be accomplished via a configuration bit.

FIG. 2 illustrates a 4+1 mapping scheme for the level 4 RAID architecture, in which four disks, disks 1, 2, 3 and 4, are used for data storage, and one disk, disk 5, is used to store parity information. The parity information generated in disk 5 is the exclusive OR of data located along corresponding sectors in disks 1–4. Thus, for example, parity information in sector P1 is the exclusive OR of data in sectors A, B, C and D, that is, P1=A⊕B⊕C⊕D. Parity information in sectors P2, P3, P4 and P5 are similarly generated from data in corresponding sectors of disks 1–4.

FIG. 3 illustrates the level 5 RAID mapping scheme. In this scheme, rather than having all the parity information located in one disk, as is the case in the RAID 4 architecture, the parity information is arranged in a diagonal fashion along disks 1-5. Thus, for example, parity information P1 is located in disk 5, parity information P2 is located in disk 4, parity information P3 is located in disk 3, parity information P4 is located in disk 2, and parity information P5 is located in disk 1. As is the case for the RAID 4 mapping scheme, parity information P1 is the exclusive OR of data in sectors A, B, C and D, parity information P2 is the exclusive OR of data in sectors E, F, G and H, parity information P3 is an exclusive OR of data in sectors I, J, K and L, parity information P4 is an exclusive OR of data in sectors M, N, P and Q, and parity information P5 is an exclusive OR of data in sectors R, S, T and U.

Thus, as can be seen from above, the parity information is generated from data in the other four disks. If new data is written to one disk, then one way of generating the parity information is to retrieve the data from the other disks to perform the exclusive OR operation. Another way of generating the new parity information is to perform an exclusive OR operation of the new data, the original data, and the corresponding original parity information. Thus, for example, if new data C is written, then new P1 can be generated by performing an exclusive OR operation of new data C with old data C and with old P1, that is, NEW P1=NEW C⊕OLD C⊕OLD P1. Additionally, if a full stripe of data is written, then parity is generated directly from the new data. Further, if a given data disk location has failed, then the remaining data locations and the parity value are read and exclusive ORed to rebuild the data.

As noted above, the DRAM 116 includes an XOR buffer 134 to allow hardware assisted XOR operations for generating new parity information. As also noted, the hardware assisted XOR operation is done by performing a write to a second address map, which is indicated by setting the most significant address bit. This most significant bit differs depending upon the configuration of the DRAM 116, as described above.

Before performing the hardware assisted XOR operation to generate parity information, a selected portion of the XOR buffer 134 is filled with zeros. This zero fill operation is performed by the bus master 126 with the aid of the zero fill block 137. The size of the zero fill operation depends upon the number of bytes to be transferred in the write operation, which is specified by the control field in the CDB. Each CDB includes a source address field and a destination address field, as well as a field which specifies the type of operation to be performed and the transfer byte length. In the preferred embodiment, the control field of the CDB includes 24 bits for specifying the transfer byte length. If a move operation is specified by the CDB, then the values of the source address and the destination address determine if the operation is an internal-to-internal memory move, an external-to-internal memory move, or an internal-to-external memory move.

After the zero fill operation, the new write data is moved by the PCI bus master 126 from system memory into the write posting cache 136. The CDB associated with this move operation specifies a source address in an external memory, a destination address in the write posting cache, and the transfer length. After the new data has been moved into the write posting cache 136, the following operations are performed. Another CDB is issued to cause the PCI bus master 126 to perform an internal-to-internal memory move to transfer the new write data from the cache 136 to the XOR buffer 134. The move operation is performed in the XOR address range. This results in the new write data being XORed with the zeros that have been filled in the XOR buffer 134. Performing an XOR function of data with zeros results in the data remaining unchanged.

Concurrently with the move operation of the new data, the local processor 106 also provides commands to the appropriate one of the SCSI controllers 112A-E to retrieve the original data from the disk subsystem 142. The appropriate SCSI controller 112A-E is also instructed to retrieve the original parity information associated with the original data.

To issue commands to the SCSI controller 112A-E, the local processor 106 provides the starting address of the command list located in memory into a pointer register in the SCSI controller 112A-E. In response, the SCSI controller 112A-E obtains control of the PCI local bus 102 to fetch the command list from memory. The SCSI controller 112A-E acts as a bus master to move the selected data to the bus slave channel 128 of the DRAM interface 118. The original data and original parity information are written to the DRAM 116 in the XOR address range at the same address as the new write data.

Alternatively, data from the other disk drives in the array can be used instead of the original data and original parity information to generate the new parity information.

The write operation from the SCSI controllers 112A-E to the DRAM interface 118 is performed through the bus slave 128 and the write FIFO 132. Depending on which is retrieved first, the old data and the old parity information are sequentially XORed with the data stored in the XOR buffer 134. The information that is ultimately written to the XOR buffer 134 is the new parity information, which is the exclusive OR of the new data, the old data and the old parity information. It is noted that after the zero fill operation, the order of the write operations is not critical because of the associative nature of the exclusive OR operation.

Similarly, in a rebuild operation when bad sectors are detected, data from the other disk drives and the corresponding old parity information are retrieved and written to the XOR buffer 134 through the bus slave channel 128. For example, referring to FIG. 2, if striping unit B is detected as being bad, the unit is rebuilt by performing an XOR of striping units A, C and D and parity information P1.

Another condition in which the XOR buffer 134 is used occurs during read checking for drive rebuild. The rebuild process checks to determine if sectors in unused stripes contain identical characteristic patterns. In the consistency checking step, a portion of the XOR buffer 134 is filled with zeros initially, followed sequentially by writes of the sectors into the XOR buffer 134 in the XOR address range. This sequentially performs an XOR of data in the sectors, with the result being all zeros if the sectors contain identical characteristic data. The zero check block 138 is used to determine if the selected portion of the XOR buffer 134 contains all zeros. More details of this operation are provided in patent application Ser. No. 08/543,011, entitled "Read Checking for Drive Rebuild," previously incorporated by reference.

Referring to FIG. 4A, a block diagram of the DRAM interface 118 and the DRAM 116 is shown. In the ensuing description, signal names followed by the characters "_" or "_L" indicate that the described signals are active low. Signal names preceded by the character "!" indicate that the signals are inverted.

In some configurations, as discussed above, the DRAM 116 can be separated into four banks 160A-D. Each bank of the DRAM 116 is associated with its own set of control signals, with row address strobe signals MRAS_[3:0], column address strobe signals MCAS_[3:0], output enable signals MOE_[3:0], and write enable signals MWE_[3:0] corresponding to banks 3–0, respectively. The four banks 160A–D share a common memory data bus MD[79:0] and address bus MA[11:0].

The memory data bus MD[79:0] is driven by a tristate buffer 162, which is enabled by a signal ODRAM_DAT_EN provided by the DRAM controller 124. The input of the tristate buffer 162 is driven by a multiplexor 402, which selects between normal write data and read-modify-write data. The upper 16 bits of MD[79:0] represent check bits when ECC mode is enabled, and bits MD[35:32] represent the parity bits when parity mode is selected in the 32-bit memory data interface configuration. The read-modify-write data bits are driven by a read-modify-write block 172, which performs an exclusive-OR of data read from the DRAM 116 with the incoming write data if a signal RMW_XOR_OPERATION is asserted high. In normal read-modify-write cycles, bytes that are not selected by byte enable signals BYTEN_TO_DRAM_L[7:0] are combined in the RMW block 172 to generate the write data for proper generation of ECC check bits.

In read-modify-write cycles, memory data MD[79:0] are read from the DRAM 116 and loaded into a hold register 176 on assertion of a signal LD_HOLD_READ_REG. The output of the hold register 176 is provided to correction logic 606 to correct errors in the data bits MD[63:0] using check bits MD[79:64]. The output of the correction logic provides the corrected read data CORRECTED_DATA[63:0], which are provided to the RMW block 172 for combination with write data ODRAM_DAT[63:0] generated by the multiplexor 402.

Normal write data !WRITE DATA_TO_DRAM_L[63:0] are provided by a multiplexor 178, which selects one of four inputs provided by internal-to-internal memory move control block 166, external-to-internal memory move control block 164, bus slave logic 128, and zero fill block 136. The internal-to-internal move control block 166 receives the read data signals CORRECTED_DATA[63:0], byte count signals BM_BYTE_COUNT_FF[23:0], and destination address I_I_DEST_ADDR[26:2]. The signals BM_BYTE_COUNT_FF[23:0] and I_I_DEST_ADDR[26:2] represent the byte transfer length control field and destination address field of the CDB associated with the internal-to-internal memory move operation.

The external-to-internal move control block 164 receives PCI data signals PCIAD, signals BM_BYTE_COUNT_FF[23:0], and destination address signals E_I_DEST_ADDR[26:2]. The bus slave logic 128 receives data signals PCIAD and latched PCI address signals PCI_BS_ADDRESS[26:2]. The zero fill block 137 receives signals BM_BYTE_COUNT_FF[23:0] and source address signals CUR_SRCE_ADDR[26:2] associated with a zero-fill CDB.

The blocks 166, 164, 128 and 137 also provide address signals to the inputs of a multiplexor 186, whose output generates signals !START_ADDRESS_TO_DRAM_L[26:2] provided to an address counter 556. The address counter 556 is loaded with the start address !START_ADDRESS_TO_DRAM_L[26:2] when a load address signal LOAD_ADR is asserted. The counter 556 is incremented when the signal INC_LCAL_DRAM_ADDR is asserted. The output LOCAL_DRAM_ADDR_FF[26:2] of the address counter 556 is provided to a row/column multiplexor 190, which separates the signals LOCAL_DRAM_ADDR_FF[26:2] into row and column addresses driven onto memory address bus MA[11:0].

The byte count signals BM_BYTE_COUNT_FF[23:0] are provided by the output of a 24-bit counter 180. The counter is initially loaded with the value on signals BC_INIT_VAL[23:0], which represent the byte transfer length from the CDB control field, when a four input OR gate 182 drives its output high. The inputs of the OR gate 182 receive signals BC_INIT_LOAD_EI, BC_INIT_LOAD_IE, BC_INIT_LOAD_II, BC_INIT_LOAD_ZF, and BC_INIT_LOAD_ZC asserted in response to the start of an external-to-internal memory move, internal-to-external memory move, internal-to-internal memory move, zero fill, and zero check, respectively. The decrement signals from the above operations are represented as signals BC_DEC_EI, BC_DEC_IE, BC_DEC_II, BC_DEC_ZF, and BC_DEC_ZC. The counter 180 is clocked on the rising edge of the signal ICLK and reset on the falling edge of the signal IRST_.

The counter 180 is decremented by the value {00, SIXTYFOUR,!SIXTYFOUR, 00} for the internal-to-internal memory move, zero fill, and zero check operations. Thus, the counter 180 is decremented by the value 8 for a 64-bit memory interface and by the value 4 for a 32-bit memory interface to represent that 8 bytes and 4 bytes are transferred on each memory cycle. The signals BC_DEC_II, BC_DEC_ZF, and BC_DEC_ZC are generated by the logic blocks 166, 137, and 138, respectively, after each transfer to the DRAM 116.

For the external-to-internal and internal-to-external memory move operations, the decrement value for the counter 180 depends on several factors. In these operations, FIFOs associated with the move operations are 4 bytes wide and 8 words deep. The FIFOs are first filled up, and then the data are moved from the FIFOs. Thus, each complete operation involves 32 bytes of data or less. The decrement value is updated before each transfer to or from a set of FIFOs. The decrement value is set equal to the byte count signals BYTE_COUNT_FF[23:0] if they are less than or equal to 32. If the value of the byte count signals BYTE_COUNT_FF[23:0] is greater than 32, the decrement value is set equal to 32 if the current source address bits 0–4 are all zeros in an external-to-internal memory move or if the current destination address bits 0–4 are all zeros in an internal-to-external memory move, i.e., the current transfer is double-word aligned. If not double-word aligned, the decrement value is set equal to the value {32–ADDR[4:0]}, where ADDR[4:0] are bits 4–0 of the current source or destination address.

When the byte counter 180 counts down to zero, logic in the active one of the blocks 166, 164 and 136 generates a terminal count signal to stop all further transfers. The byte count signals BM_BYTE_COUNT_FF[23:0] are not used by the bus slave logic 128 because an external bus master keeps track of how many bytes have been transferred.

The DRAM controller 124 includes a state machine 168 and peripheral logic 170, which generates the DRAM control signals MRAS_[3:0], MCAS_[3:0], MOE_[3:0], and MWE_[3:0]. The peripheral logic 170 also generates the data enable signal ODRAM_DAT_EN and load address signal LOAD_ADR. Various input signals are provided to the DRAM controller 124, which will be described in greater detail below.

Figure 4B:
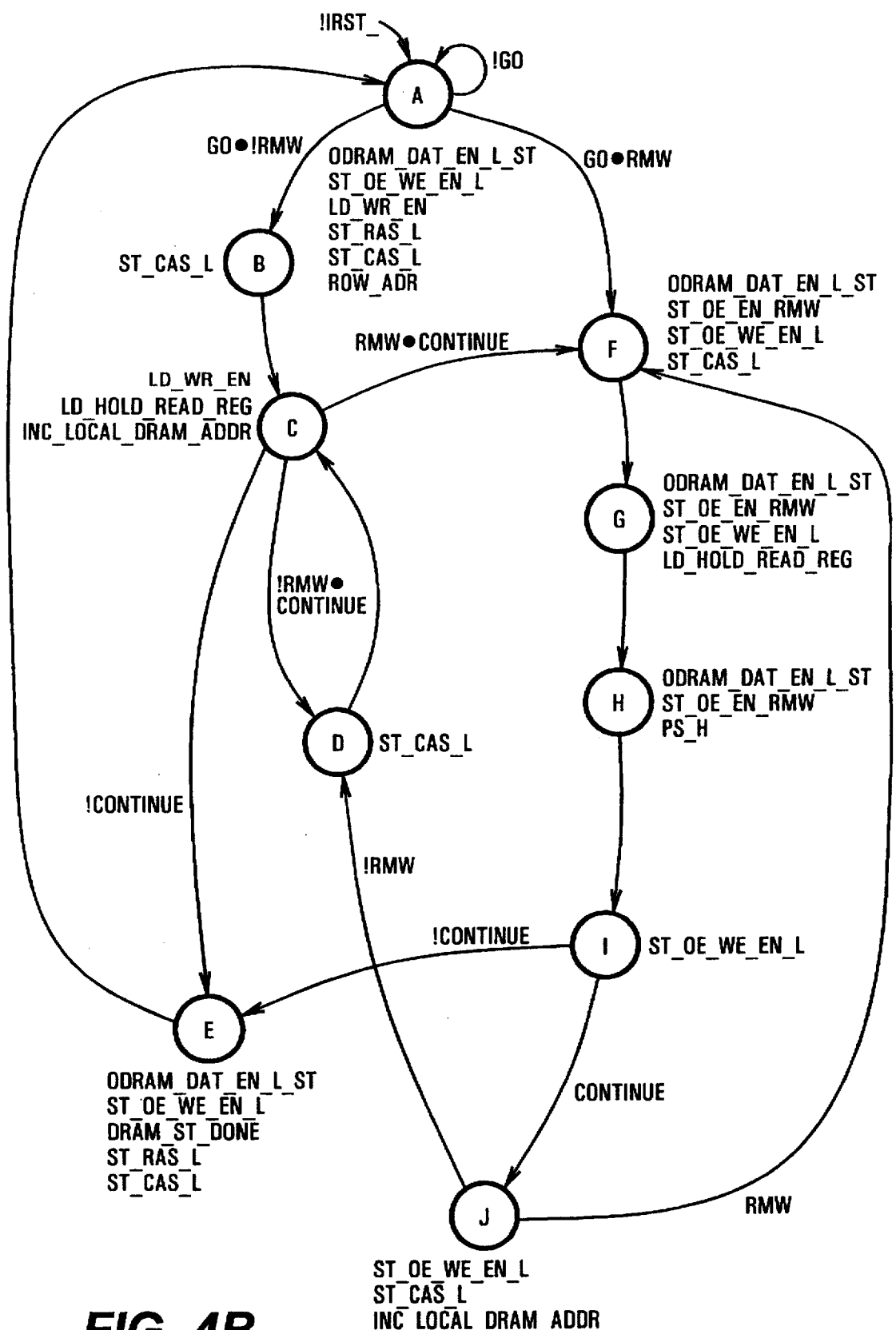
FIG. 4B is a flow diagram of a state machine in a memory interface of FIG. 4A.

Referring now to FIG. 4B, a state diagram of a DRAM controller state machine 168 is shown. As discussed above, a write to the normal address range of the DRAM interface 118 results in a normal write operation to the DRAM 116. However, a write to the XOR address range causes a read-modify-write operation to be performed, in which data is read from the XOR buffer 134 and XORed with the write data. On the falling edge of the PCI reset signal IRST_, the DRAM controller state machine 168 enters idle state A, where it remains while the signal IRST_ is asserted low or while a signal GO is negated low.

In state A, the following signals are driven high: a load-write-data enable signal LD_WR_EN, data output enable signal ODRAM_DAT_EN_L_ST, write enable signal ST_OE_WE_EN_L, RAS_ enable signal ST_RAS_L, CAS_ enable signal ST_CAS_L, and row address multiplexing signal ROW_ADR. Thus, in state A, the RAS_ and CAS_ signals provided to the DRAM 116 are deasserted high. The signal ROW_ADR is asserted high to select the row address to be driven out to the memory address bus FLA.

When the signal GO and signal RMW are asserted high, the DRAM controller state machine 168 transitions from state A to state F. The signal GO is asserted high for one PCI clock ICLK period when any of the DRAM requestors other than the CBR refresh controller 122 is granted access to the DRAM 116. The signal RMW indicates a read-modify-write cycle is in progress. The signal RMW is asserted high during a write to the XOR address range, or when any of the byte enable signals BYTEN_TO_DRAM_L[7:0] are negated high when a 64-bit data bus MD is used, or when any of the byte enable signals BYTEN_TO_DRAM_L[3:0] is negated high when a 32-bit data bus MD is used. Since the DRAM interface 118 is configurable to ECC mode, all 32 bits or 64 bits of data must be available to properly generate the ECC check bits. For that reason, any writes of less than the entire width of the DRAM 116 result in a read-modify-write cycle. The bytes that are not being written are read from the DRAM 116 and combined in the DRAM interface 118 to produce the proper ECC check bits.

In state F, the signal ODRAM_DAT_EN_L_ST is maintained high to ensure that the data outputs of the DRAM interface 118 are disabled. In state F, the signal ST_OE_EN_RMW is driven high, which enables the output enable signals OE_[0:3] driven to DRAM banks 0—3, respectively. The signal ST_RAS_L is negated low to enable assertion of the RAS_[3:0] signals, and the signal ST_CAS_L is maintained high to disable the CAS_[3:0] signals. The signal ROW_ADR is also deasserted low to select the column address for outputting to the memory address bus MA. Additionally, in state F, a signal ST_OE_WE_EN_L is driven high. As will be explained in greater detail below, the signal ST_OE_WE_EN_L being driven high disables write enable signals WE_[3:0] until some other event occurs.

From state F, the DRAM controller state machine 168 transitions from state F to state G, where the signal ST_CAS_L is dropped low to enable assertion of the CAS_[3:0] signals to load in the column address into the DRAM 116. In state G, the signal ST_OE_EN_RMW is maintained high to enable assertion of the output enable signals OE_[3:0], which enable the selected DRAM bank to drive the read data onto the data bus MD. The signals ODRAM_DAT_EN_L_ST and ST_OE_WE_EN_L are maintained high. Additionally, the signal LD_HOLD_READ_REG is asserted high to load the read data being driven by the DRAM 116 into registers located in the DRAM interface 118.

From state G, the DRAM controller state machine 168 transitions to state H, where the signal ODRAM_DAT_EN_L_ST and ST_OE_WE_EN_L are maintained high, but the signal ST_OE_EN_RMW is dropped low to disable the output enable signals OE_[3:0]. The signal LD_HOLD_READ_REG is negated low to latch the DRAM read data. In addition, a signal PS_H is asserted high, which enables assertion of the write enable signals WE_[3:0] to the DRAM 116 half an ICLK period later. Thus, state H is the transition state at which the read cycle ends and the write cycle starts in the read-modify-write cycle.

From state H, the DRAM controller state machine 168 transitions to state I, where all signals except ST_OE_WE_EN_L are driven low. In state I, the data outputs of the DRAM interface 118 are enabled to drive the data bus MD, and the appropriate one of the write enable signals WE_[3:0] is asserted to perform a write to the selected DRAM bank.

From state I, there are two possible transitions. The DRAM controller state machine 168 transitions from state I to state E if a signal CONTINUE is deasserted low, and to state J if the signal CONTINUE is asserted high. The signal CONTINUE is deasserted when the end of a DRAM page is reached, that is, all the column address bits are high. The signal CONTINUE is also deasserted if a CBR refresh request preempts all other requests for the DRAM 116. In a write cycle addressed to the DRAM 116, the signal CONTINUE is also deasserted if the selected one of several write FIFOs in the DRAM interface 118 is empty, which indicates that no more write data is available. The DRAM interface 118 includes three sets of write FIFOs, one set for storing data in an internal-to-internal memory move operation, one set for storing data in an external-to-internal memory move operation, and the write FIFO 132 associated with the PCI bus slave 128.

In state J, the signal ST_OE_WE_EN_L is maintained high and the signal ST_CAS_L is driven high to disable the CAS_[3:0] signals. The selected one of the signals CAS_[3:0] are brought high and driven back low again at a later time to begin a new cycle in the memory page. Also, in state J, a signal INC_LCAL_DRAM_ADDR is asserted high to increment the memory address MA driven to the DRAM 116. If the signal RMW is asserted high, indicating that the next cycle is a read-modify-write cycle, the state machine returns to state F. If the signal RMW is deasserted low, however, the state machine transitions from state J to state D to perform a normal write.

The other half of the DRAM controller state machine 168 which performs the normal write cycles and the read cycles is now described. The state machine transitions from state A to state B if the signal GO is asserted high and the signal RMW is deasserted low. In state B, all signals except ST_CAS_L are driven low. As will be described below with respect to FIGS. 6A, 6B and 6C, whether the output enable signals OE_[3:0](for a read cycle) or the write enable signals WE_[3:0](for a write cycle) are asserted depends on the state of a signal WRITE_TO_DRAM. If the signal WRITE_TO_DRAM is asserted high, then the write enable signals WE_[3:0] are enabled. However, if the signal WRITE_TO_DRAM is deasserted low, then the output enable signals OE_[3:0] are enabled.

In state B, the selected one of the RAS_[3:0] signals is asserted, while the CAS_[3:0] are maintained deasserted high. From state B, the state machine transitions to state C, where the signals LD_WR_EN and LD_HOLD_READ_REG are asserted high and the signal ST_CAS_L is asserted low to enable assertion of the CAS_[3:0] signals. In state C, the signal INC_LCAL_DRAM_ADDR is asserted high to increment the memory address MA to the DRAM 116. If the operation is a write cycle, then the signal LD_WR_EN causes the proper data to be loaded into registers that drive the data outputs of the DRAM interface 118. If the operation is a read cycle, then the signal LD_HOLD_READ_REG loads in the data driven by the DRAM 116 into appropriate registers.

There are three possible transitions out of state C. If the signal CONTINUE is deasserted low, indicating an end of the transfer operation, then the state machine transitions from state C to state E. If the signal RMW remains deasserted and the signal CONTINUE is asserted high, the state machine transitions from state C to state D, where the signal ST_CAS_L is negated high to deassert the CAS_[3:0] signals. From state D, the DRAM controller state machine 168 returns to state C, where the signal ST_CAS_L is driven low to re-enable the CAS_[3:0] signals.

In state C, if the read-modify-write signal RMW is asserted high and the signal CONTINUE is asserted high, then the state machine transitions to state F, from where a read-modify-write cycle is begun.

In state E, the signal DRAM_ST_DONE is asserted high to indicate that the DRAM controller 124 has completed operation. The signals ST_RAS_L and ST_CAS_L are brought back high to disable the RAS_[3:0] and CAS_[3:0] signals. The signals ODRAM_DAT_EN_L_ST and ST_OE_WE_EN_L are also driven high. From state E, the state machine returns to idle state A.

Figure 5A:
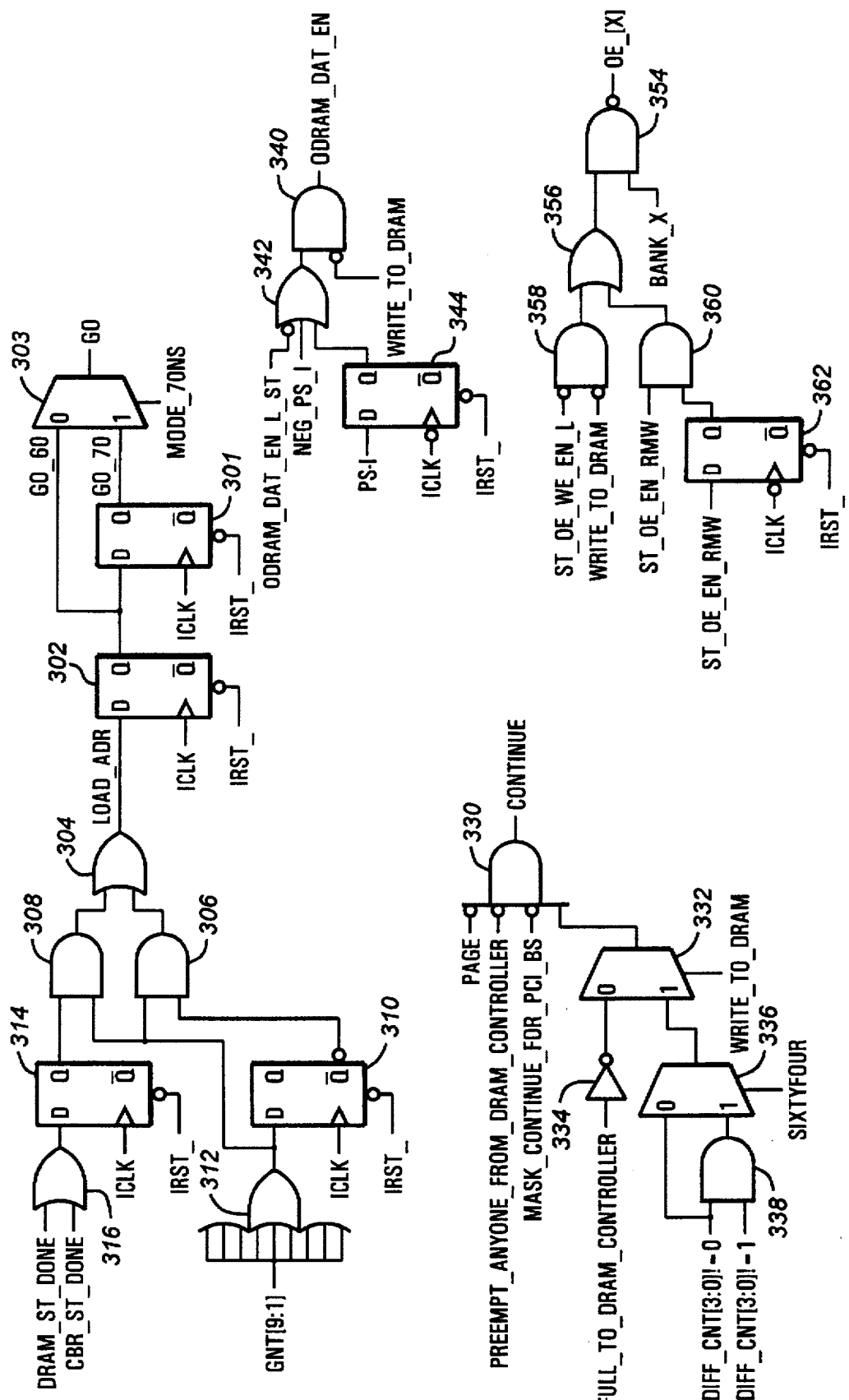
FIG. 5 is a schematic diagram of logic which cooperates with the state machine of FIG. 4A.
Figure 5B:
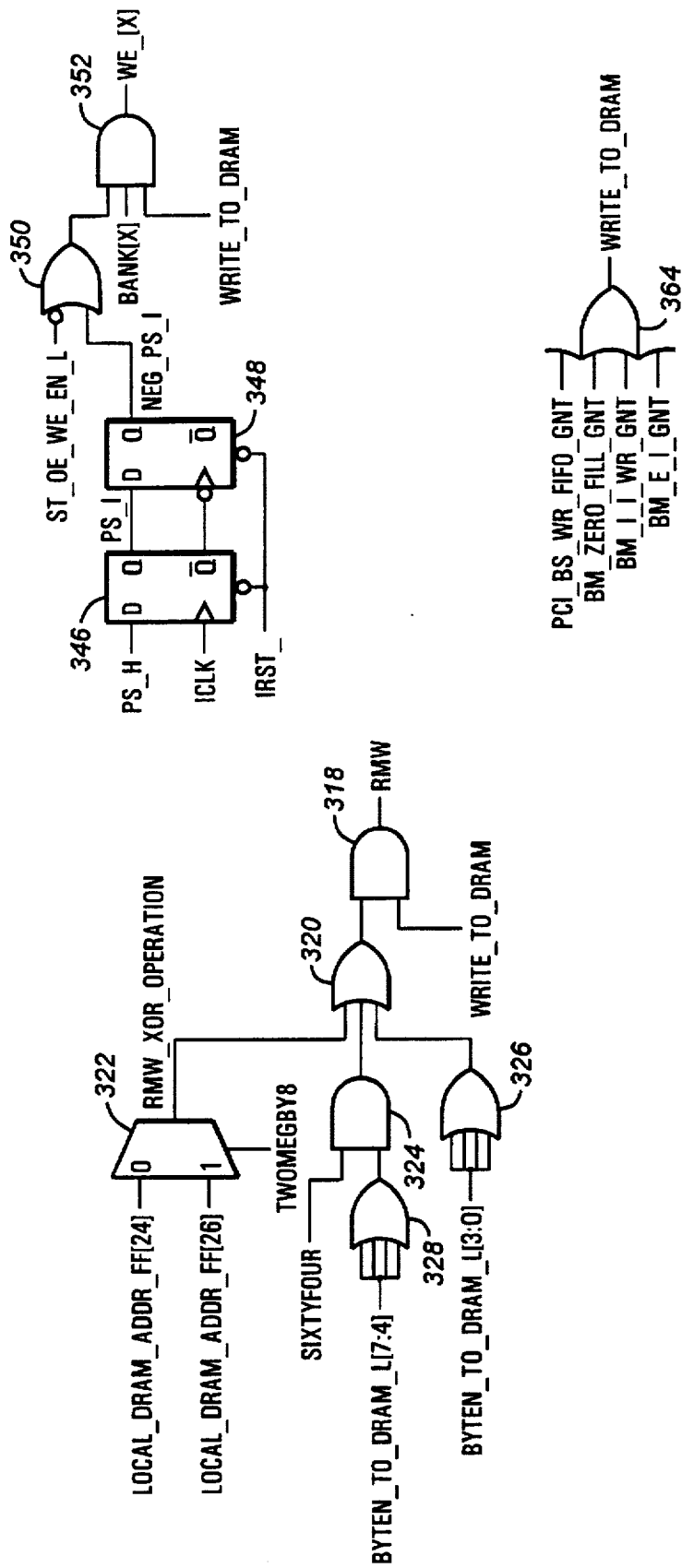

Referring now to FIG. 5, a schematic diagram is shown of logic that interacts with the DRAM controller state machine 168 of FIG. 4B. The signal GO is provided by the output of a 2:1 multiplexor 303, whose 0 and 1 inputs receive a signal GO_60 and GO_70 used for 60-NS and 70-NS DRAM speeds, respectively. The select input receives a signal MODE_70NS. The signals GO_60 and GO_70 are provided by the non-inverting outputs of D-type flip-flops 302 and 301, respectively, which are both clocked on the rising edge of the signal ICLK and reset on the falling edge of the signal IRST_. The D input of the flip-flop 301 is connected to the signal GO_60, and the D input of the flip-flop 302 is connected to the output of an OR gate 304. The inputs of the OR gate 304 are connected to the outputs of AND gates 306 and 308. One input of the AND gate 306 is connected to the inverting output of a D-type flip-flop 310, and the other input of the AND gate 306 is connected to a signal WIN. The flip-flop 310 is clocked by the signal ICLK and reset by the signal IRST_. The D input of the flip-flop 310 receives the signal WIN, which is generated by the output of a nine-input OR gate 312. The inputs of the OR gate 312 receive grant signals GNT[9:1], which correspond to the various requestors for the DRAM 116 as discussed above. The signal GNT[0] corresponds to the CBR refresh request. Thus, if the DRAM 116 is granted to any requestor other than the CBR refresh controller 122, the signal WIN is asserted high. This causes the signal GO to be pulsed high for one ICLK period.

The inputs of the AND gate 308 receive the signal WIN and the non-inverting output of a D-type flip-flop 314, which is clocked by ICLK and reset by IRST_. The D input of the flip-flop 314 is connected to the output of an OR gate 316, whose inputs receive signals DRAM_ST_DONE and CBR_ST_DONE. As noted above, the signal DRAM_ST_DONE indicates that the DRAM controller state machine 168 has completed operation. Similarly, the signal CBR_ST_DONE indicates that the CBR refresh controller 122 has completed operation. Thus, the signal GO is pulsed high for one ICLK period after completion of a CBR cycle or a DRAM cycle if the signal WIN is asserted indicating that a grant has been issued to a DRAM request. This ensures that the signal GO is pulsed high in state A of the DRAM controller state machine 168 if another request is pending.

The signal RMW is generated by the output of an AND gate 318, whose first input is connected to the output of an OR gate 320 and whose other input receives the signal WRITE_TO_DRAM. One input of the OR gate 320 receives a signal RMW_XOR_OPERATION, which is provided by the output of a 2:1 multiplexor 322. The second input of the OR gate 320 is connected to the output of an AND gate 324, and its third input is connected to the output of a four-input OR gate 326.

The signal RMW_XOR_OPERATION when asserted high indicates a write to the XOR address range. The 0 input of the multiplexor 322 receives a signal LOCAL_DRAM_ADDR_FF[24], and the 1 input receives a signal LOCAL_DRAM_ADDR_FF[26]. The select input of the multiplexor 322 receives a signal TWOMEGBY8, which indicates that the DRAM 116 is implemented with 2Mx8 DRAM chips. Thus, if the DRAM 116 is implemented with 2Mx8 DRAM chips, address bit 26 distinguishes between normal writes and read-modify-write XOR cycles; otherwise, address bit 24 provides the distinction.

One input of the AND gate 324 is connected to the output of a four-input OR gate 328, and the other input receives a signal SIXTYFOUR which indicates that the memory data bus MD between the DRAM interface 118 and the DRAM 116 is 64 bits wide. The inputs of the OR gate 328 receive byte enable signals BYTEN_TO_DRAM_L[7:4], and the inputs of the OR gate 326 receive signals BYTEN_TO_DRAM_L[3:0]. The signal RMW is asserted high in response to a read-modify-write XOR cycle and to any write cycle where not all the bytes are selected. Therefore the RMW signal is asserted to indicate some sort of read-modify-write cycle is needed.

The signal CONTINUE is provided by a four-input AND gate 330, whose inputs receive the inverted state of a signal PAGE, the inverted state of a signal PREEMPT_ANYONE_FROM_DRAM_CONTROLLER, and the inverted state of a signal MASK_CONTINUE_FOR_PCI_BS. The last input of the AND gate 330 is connected to the output of a 2:1 multiplexor 332. The signal PAGE when asserted indicates that the end of a DRAM page has been reached, that is, the column address bits are all high. The signal PREEMPT_ANYONE_FROM_DRAM_CONTROLLER is asserted when two CBR refresh requests are pending. The signal MASK_CONTINUE_FOR_PCI_BS is asserted high if a request is asserted by one of the bus slave read FIFOs 130 and the request has not been granted, or if a request is asserted by the bus slave write FIFO 132 and the request is not granted. If any of the signals PAGE, PREEMPT_ANYONE_FROM_DRAM_CONTROLLER or MASK_CONTINUE_FOR_PCI_BS is asserted high, then the signal CONTINUE is deasserted low.

The 0 input of the multiplexor 332 is connected to the output of an inverter 334, and the 1 input is connected to the output of a 2:1 multiplexor 336. The select input of the multiplexor 332 is connected to the signal WRITE_TO_DRAM. The input of the inverter 334 is connected to a signal FULL_TO_DRAM_CONTROLLER, which indicates that the read FIFOs 130 are full. The 0 input of the multiplexor 336 is connected to a signal DIFF_CNT[3:0] !=0, which is also connected to one input of an AND gate 338. The other input of the AND gate 338 is connected to a signal DIFF_CNT[3:0]!=1. The signals DIFF_CNT[3:0] are counter signals indicating when the selected one of the several write FIFOs in the DRAM interface 118 is empty. Each of the various write FIFOs includes a counter that keeps track of how much data is in the FIFO. The output signals from those difference counters are multiplexed onto the signals DIFF_CNT[3:0]. The output of the AND gate 338 is connected to the 1 input of the multiplexor 336, whose select input is connected to the signal SIXTYFOUR. Thus, the signal CONTINUE is asserted high if the selected write FIFO is not empty in a write cycle, and if the selected read FIFO 130 is not empty in a read cycle.

The data output enable signal ODRAM_DAT_EN enables the data outputs of the DRAM interface 118 which drive the memory data bus MD. The signal ODRAM_DAT_EN is generated by an AND gate 340, whose first input is connected to the output of a three-input OR gate 342, and whose second input receives the signal WRITE_TO_DRAM. The first input of the OR gate 342 receives the inverted state of the signal ODRAM_DAT_EN_L_ST provided by the DRAM controller state machine 168. The next input of the OR gate 342 receives a signal NEG_PS_I, and the last input is connected to the non-inverting output of a D-type flip-flop 344. The D input of the flip-flop 344 receives a signal PS_I, and the flip-flop 344 is clocked by the signal ICLK and reset by the signal IRST_. Effectively, the signal PS_I when asserted high represents that the DRAM controller state machine 168 is in state I.

The signal PS_I is connected to the non-inverting output of a D-type flip-flop 346 as well as to the D input of a D-type flip-flop 348. The D input of the flip-flop 346 receives the signal PS_H generated by the DRAM controller state machine 168 when it is in state H. Both flip-flops 346 and 348 are reset by the signal IRST_, with the flip-flop 346 being clocked on the rising edge of the signal ICLK and the flip-flop 348 being clocked on the falling edge of the signal ICLK. The non-inverting output of the flip-flop 348 provides the signal NEG_PS_I, which represents the signal PS_I delayed by half an ICLK period. Thus, if the signal ODRAM_DAT_EN_L_ST is deasserted low, then the data enable signal ODRAM_DAT_EN is asserted high if the signal WRITE_TO_DRAM is asserted. In addition, the data enable signal ODRAM_DAT_EN is pulsed high half an ICLK period after the signal PS_I is asserted high for a duration of 1½ ICLK periods.

The signal NEG_PS_I is also provided to one input of an OR gate 350, whose other input receives the inverted state of a signal ST_OE_WE_EN_L. The output of the OR gate 350 is connected to one input of a three-input NAND gate 352, whose other inputs receive a signal BANK_X, X=0-3, and the signal WRITE_TO_DRAM. The signal BANK_X is asserted high if the corresponding DRAM bank is selected by the incoming address. The output of the NAND gate 352 drives write enable signal WE_[X] to the DRAM 116.

The output enable signal OE_[X], X=0-3, is provided by a NAND gate 354, whose first input receives the signal BANK_X, and whose other input is connected to the output of an OR gate 356. The inputs of the OR gate 356 are connected to the output of a NOR gate 358 and to the output of an AND gate 360. The inputs of the NOR gate 358 receive the signals ST_OE_WE_EN_L and WRITE_TO_DRAM. One input of the AND gate 360 receives the signal ST_OE_EN_RMW provided by the DRAM controller state machine 168, and the other input is connected to the non-inverting output a D-type flip-flop 362. The D input of the flip-flop 362 receives the signal ST_OE_EN_RMW, and the flip-flop 362 is clocked on the falling edge of the signal ICLK and reset on the falling edge of the signal IRST_. Thus, if both signals ST_OE_WE_EN_L and WRITE_TO_DRAM are low, then the signal OE_[X] is asserted low if the signal BANK_X is asserted high. In addition, the signal OE_[X] is asserted low half an ICLK period after assertion of the signal ST_OE_EN_RMW if the signal BANK_X is high.

The signal WRITE_TO_DRAM is provided by a four-input OR gate 364, whose inputs receive signals PCI_BS_WR_FIFO_GNT, BM_ZERO_FILL_GNT, BM_I_I_WR_GNT, and BM_E_I_GNT, which correspond to the grant of a request from the bus slave write FIFO 132, a request from the zero fill block 138, a request by the bus master 126 for an internal-to-internal memory write operation, and a request by the bus master 126 for an external-to-internal memory write operation, respectively.

Figure 6A:
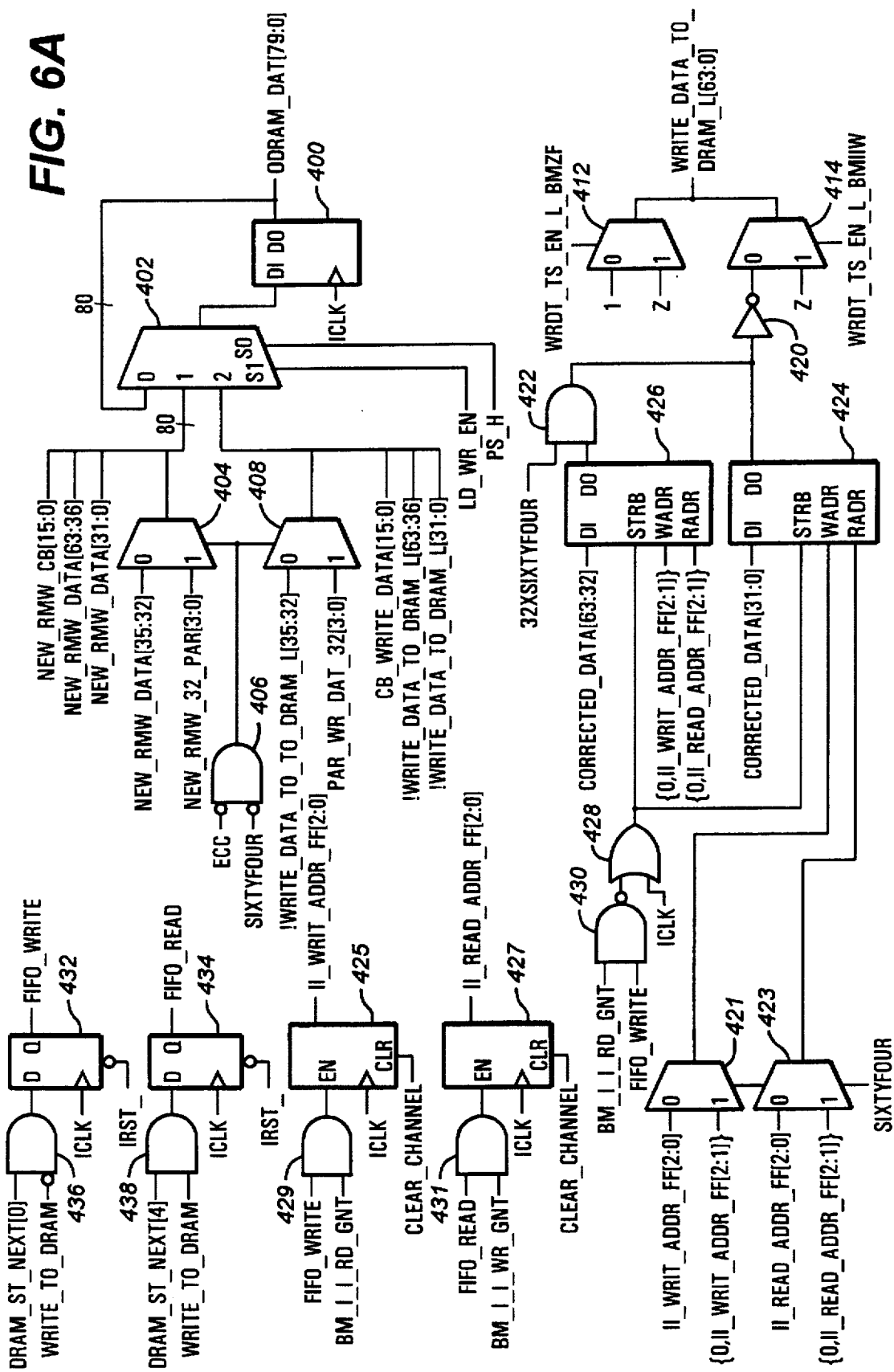
FIGS. 6A–6C are a schematic diagram of logic included in the data path of the memory interface of FIG. 4A.
Figure 6B:
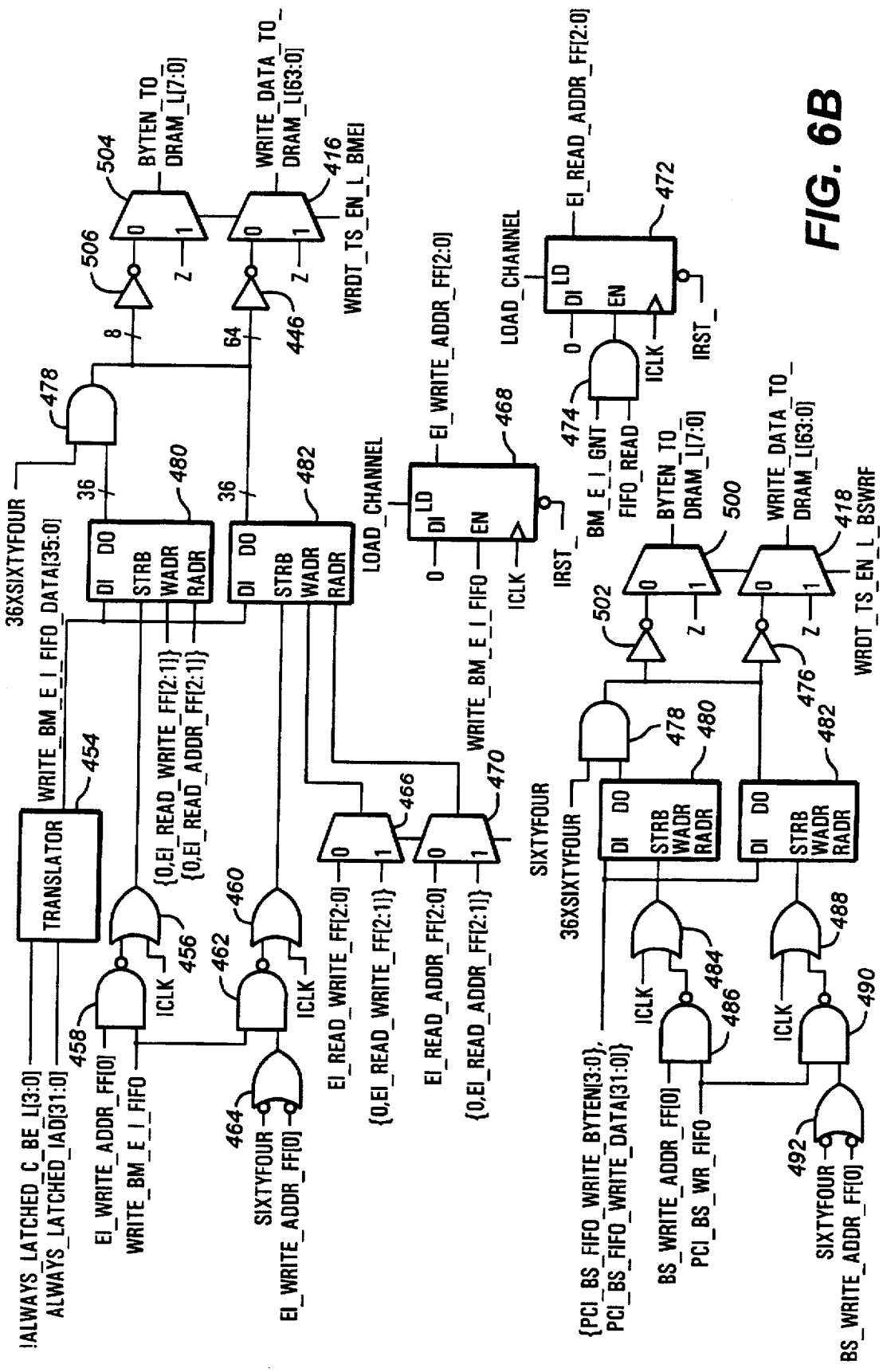
Figure 6C:
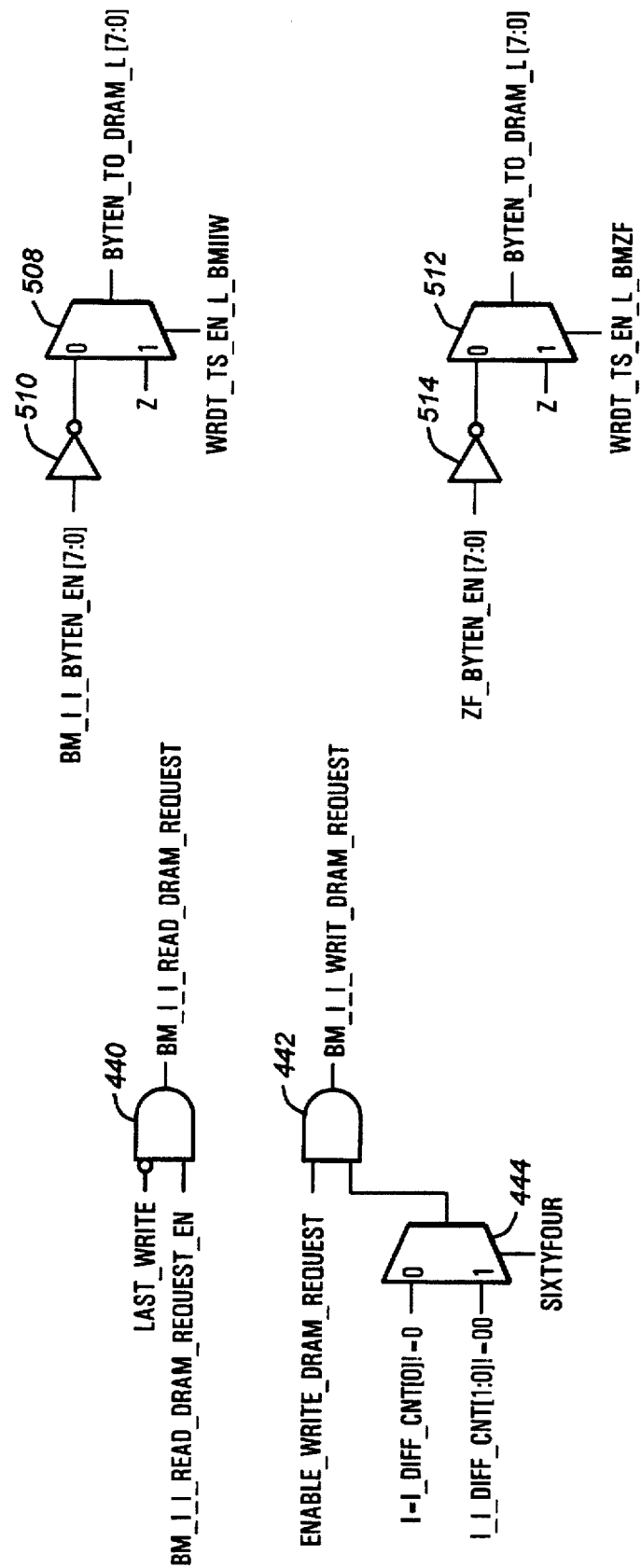
Figure 7:
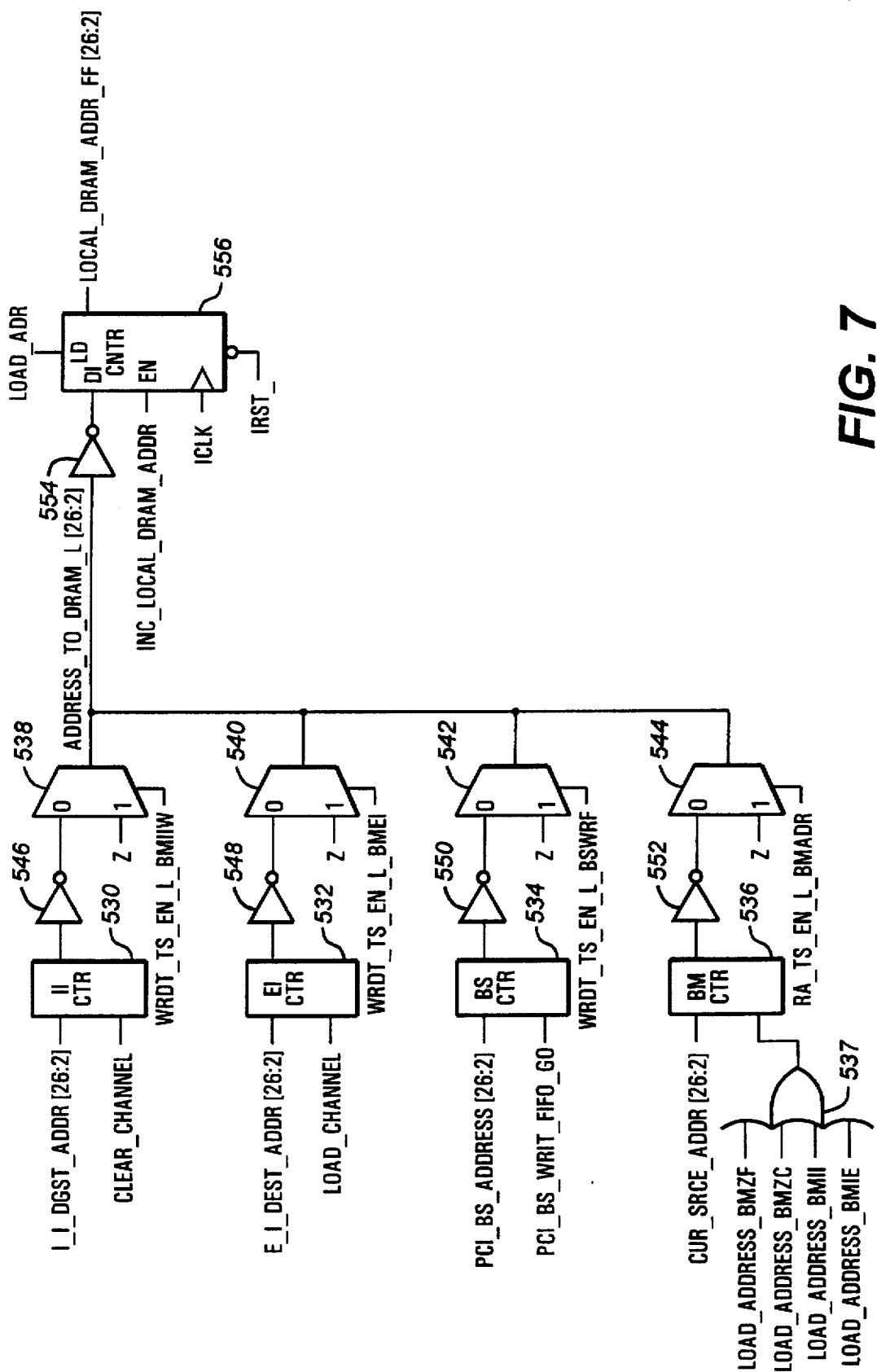
FIG. 7 is a schematic diagram of portions of the address path of the memory interface of FIG. 4A.

Referring now to FIGS. 6A-C, a schematic diagram of portions of the data path in the DRAM interface 118 is shown. The memory data outputs from the DRAM interface 118 are driven by signals ODRAM_DAT[79:0], with the most significant 16 bits corresponding to the ECC check bits if ECC mode is selected. For a 32-bit data bus MD, bits ODRAM_DAT[63:32] are ignored if ECC mode is selected. If parity mode is selected, then bits ODRAM_DAT[35:32] are the parity bits corresponding to the four bytes of memory data. The register 400 is clocked by the signal ICLK, and the data input of the register 400 is connected to the output of the 240:80 multiplexor 402. The 0 input of the multiplexor 402 is connected to the data signals ODRAM_DAT[79:0] to maintain the data signals latched. The 1 input of the multiplexor 402 is connected to the read-modify-write XOR data bits, with the most significant 16 bits being check bit signals NEW_RMW_CB[15:0], followed by 28 data bits NEW_RMW_DATA[63:36]. The next four bits are provided by the output of an 8:4 multiplexor 404, and the least significant 32 bits are data signals NEW_RMW_DATA[31:0].

The 0 input of the multiplexor 404 is connected to data signals NEW_RMW_DATA[35:32], and the 1 input is connected to parity signals NEW_RMW_32_PAR[3:0]. The select input of the multiplexor 404 is connected to the output of a NOR gate 406, whose inputs receive signals ECC and SIXTYFOUR. In the preferred embodiment, if the memory data bus MD is 64 bits wide, then ECC mode is selected. Thus, if ECC mode is selected, the multiplexor 404 provides data signals NEW_RMW_DATA[35:32]. If parity mode is selected, then the multiplexor 404 provides parity signals NEW_RMW_32_PAR[3:0].

The 2 input of the multiplexor 402 receives the normal write data, with the most significant 16 bits being check bits CB_WRITE_DATA[15:0], followed by the inverted state of signals WRITE_DATA_TO_DRAM_L[63:36]. The next four bits are provided by the output of an 8:4 multiplexor 408, and the least significant 32 bits are the inverted state of signals WRITE_DATA_TO_DRAM_L[31:0]. The 0 input of the multiplexor 408 receives the inverted state of the data signals WRITE_DATA_TO_DRAM_L[35:32], and the 1 input receives parity signals PAR_WR_DAT_32[1:0]. The select input of the multiplexor 408 is connected to the output of the NOR gate 406.

The select inputs S1 and S0 of the multiplexor 402 receive signals LD_WR_EN and PS_H, respectively, which are both provided by the DRAM controller state machine 168. The signal LD_WR_EN is asserted high to select the normal write data, and the signal PS_H is asserted high to select the read-modify-write data. Both signals LD_WR_EN and PS_H are deasserted low to maintain the state of the signals ODRAM_DAT[79:0] latched.

The data signals WRITE_DATA_TO_DRAM_L[63:0] are connected to the outputs of 128:64 multiplexors 412, 414, 416 and 418. Contention between the outputs of the multiplexors 412-418 is avoided by setting the 1 inputs of each of the multiplexors to a tristate state, as represented by the letter "Z." Thus, when the 1 inputs of the multiplexors 412-418 are selected, the output of those multiplexors are tristated. Only one of the multiplexors 412-418 will be driving the signals WRITE_DATA_TO_DRAM_L[63:0] at a time. The 0 input of the multiplexor 412 is tied high, and its select input is connected to a signal WRDT_TS_EN_L_BMZF, which is driven low if a zero fill operation is granted access to the DRAM 116. The zero fill operation is accomplished by driving signals WRITE_DATA_TO_DRAM_L[63:0] all high.

The 0 input of the multiplexor 414 is connected to the output of a 64-bit inverter 420, and its select input is connected to a signal WRDT_TS_EN_L_BMIIW which indicates an internal-to-internal memory write operation. The upper 32 input bits of the inverter 420 are driven by an AND gate 422 and the lower 32 bits are driven by the 32-bit output of a FIFO 424. One input of the AND gate 422 is connected to the 32-bit output of a FIFO 426, and the other input of the AND gate 422 receives the signal SIXTYFOUR repeated 32 times. The AND gate 422 performs a bit-wise AND operation of the 32 SIXTYFOUR signals and the 32-bit data output of the FIFO 426.

Each of the FIFOs 424 and 426 is 32 bits wide and eight words deep. The FIFOs 424 and 426 are used for storing data read from the DRAM 116 in the internal-to-internal memory move operation for subsequent write to another location in the DRAM 116. The 32-bit data inputs of the FIFOs 426 and 424 receive signals CORRECTED_DATA[63:32] and CORRECTED_DATA[31:0], respectively. If ECC mode is enabled, the signals CORRECTED_DATA[63:0] are the corrected version of the data read from the DRAM 116. If ECC mode is not enabled, then the signals CORRECTED_DATA[63:0] are the unchanged read data from the DRAM 116.

The write strobe inputs of the FIFOs 426 and 424 are driven by the output of an OR gate 428, whose first input receives the signal ICLK and whose other input is connected to the output of a NAND gate 430. One input of the NAND gate 430 receives the internal-to-internal memory read grant signal BM_I_I_RD_GNT, which is asserted high by the arbiter 120 during the DRAM read portion of an internal-to-internal memory move operation for subsequent write to another location in the DRAM 116. The other input of the NAND gate 430 receives a FIFO write signal FIFO_WRITE. Data is loaded into the FIFOs 424 and 426 when their strobe inputs are asserted low.

The signal FIFO_WRITE is provided by the non-inverting output of a D-type flip-flop 432, whose D input is connected to the output of an AND gate 436. One input of the AND gate 436 is connected to the next state bit DRAM_ST_NEXT[0] of the DRAM controller state machine 168. The other input of the AND gate 436 receives the inverted state of the signal WRITE_TO_DRAM. Thus, in a read operation, the signal FIFO_WRITE is asserted high if the next state of the DRAM state machine is either state D or state E. This causes the data read from the DRAM 116 to be written to the selected FIFO.

A FIFO read signal FIFO_READ is provided by the non-inverting output of a D-type flip-flop 434, whose D input is connected to the output of an AND gate 438. The inputs of the AND gate 438 receive the next state bit DRAM_ST_NEXT[4] and the signal WRITE_TO_DRAM. Thus, in a write cycle, the FIFO_READ signal is asserted high when the next state of the DRAM controller state machine 168 is either state B, D, or F. This causes data to be read from the selected FIFO.

An internal-to-internal memory read request signal BM_I_I_RED_DRAM_REQUEST is provided by art AND gate 440 (FIG. 6C). One of the inputs of the AND gate 440 receives the inverted state of a signal LAST_WRITE, and the other input receives a signal BM_I_I_READ_DRAM_REQUEST_EN, which is maintained high by the PCI bus master 126 during an internal-to-internal memory read operation until the FIFOs 426 and 424 are filled up or until all the data have been read. The signal LAST_WRITE is asserted high on a write to the last location of the FIFOs 426 and 424. The signal BM_I_I_READ_DRAM_REQUEST is provided to the arbiter 120, which asserts the grant signal BM_I_I_RD_GNT if higher priority requests are not asserted.

An internal-to-internal memory write request signal BM_I_I_WRIT_DRAM_REQUEST is generated by an AND gate 442, whose first input receives a signal ENABLE_WRITE_DRAM_REQUEST, which is maintained high in an internal-to-internal memory write operation until all the data in the FIFOs 426 and 424 have been read. The other input of the AND gate 442 is connected to the output of a 2:1 multiplexor 444, whose select input is connected to the signal SIXTYFOUR. The 0 input of the multiplexor 444 is connected to a signal I_I_DIFF_CNT[0]!=0 and the 1 input is connected to a signal I_I_DIFF_CNT[1:0]!=00. These signals represent that counter signals I_I_DIFF_CNT[3:0] associated with FIFOs 424 and 426 have counted down to zero, i.e., all the data in the FIFOs 426 and 424 have been read.

The write address input to the FIFO 426 receives signals {0,II_WRIT_ADDR_FF[2:1]}, and its read address input receives signals {0,II_READ_ADDR_FF[2:1]}. The write address input of the FIFO 424 is connected to the output of a 6:3 multiplexor 421, whose select input receives the signal SIXTYFOUR. The 0 input of the multiplexor 421 receives FIFO write address bits II_WRIT_ADDR_FF[2:0], and the 1 input receives signals {0,II_WRIT_ADDR_FF[2:1]}. The read address input of the FIFO 424 is connected to the output of a 6:3 multiplexor 423, whose select input also receives the signal SIXTYFOUR. The 0 input of the multiplexor 423 receives FIFO read address bits II_READ_ADDR_FF[2:0], and the 1 input receives signals {0,II_READ_ADDR_FF[2:1]}.

The FIFO write address bits II_WRIT_ADDR_FF[2:0] are provided by the output of a counter 425, which is clocked on the rising edge of the signal ICLK. The clear input of the counter 425 receives a signal CLEAR_CHANNEL, which is asserted high for one ICLK period in response to an internal-to-internal memory move cycle starting. The enable input of the counter 425 is connected to the output of an AND gate 429, whose inputs receive the FIFO write signal FIFO_WRITE and the internal-to-internal memory read grant signal BM_I_I_RD_GNT. The counter 425 is incremented by the value {0,SIXTYFOUR, !SIXTYFOUR} Thus, if the memory data bus MD is 64 bits wide, the counter 425 increments by the value 2; otherwise, the counter 425 increments by the value 1.

The FIFO read address bits II_READ_ADDR_FF[2:0] are provided by the output of a counter 427, which is also clocked on the rising edge of the signal ICLK. The clear input of the counter 427 is similarly connected to the signal CLEAR_CHANNEL, and its enable input is connected to the output of art AND gate 431. The inputs of the AND gate 431 receive the FIFO read signal FIFO_READ and the internal-to-internal memory write grant signal BM_I_I_WR_GNT. The counter 427 is also incremented by the value {0,SIXTYFOUR, !SIXTYFOUR}.

In summary, for an internal-to-internal memory move operation, data is first read from the DRAM 116 and written to the FIFOs 424 and 426 until all data have been read or until the FIFOs 424 and 426 fill up. Next, in the write portion, the data are retrieved from the FIFOs 424 and 426 and written to the DRAM 116. The write operation continues until all data have been read from the FIFOs 424 and 426. If a 32-bit DRAM memory bus MD is used, only the FIFO 424 is used.

Write data associated with an external-to-internal memory move operation are driven by the multiplexor 416. The select input of the multiplexor 416 receives a signal WRDT_TS_EN_L_BMEI, which is asserted low in an external-to-internal move operation. The 0 input of the multiplexor 416 is connected to the output of a 64-bit inverter 446. The upper 32 input bits of the inverter 446 is connected to the lower 32 output bits of a 36-bit AND gate 448. The upper four output bits of the AND gate 448 correspond to bits 4–7 of the DRAM byte enable signals BYTEN_TO_DRAM_L[7:0]. The lower 32 bits of the inverter 446 are driven by the lower 32 output bits of a FIFO 450. The upper four bits of the FIFO 450 correspond to bits 0–3 of the DRAM byte enable signals BYTEN_TO_DRAM_L[7:0]. One input of the AND gate 448 receives the signals SIXTYFOUR repeated 36 times, while the other input is connected to the 36-bit output of a FIFO 452. Each FIFO 450 and 452 is 36 bits wide and 8 words deep.

The data inputs of the FIFOs 450 and 452 are connected to signals WRITE_BM_E_I_FIFO_DATA[35:0], which are provided by a data translator 454. The translator 454 receives the latched and inverted version of the PCI byte enable signals !ALWAYS_LATCHED_C_BE_L[3:0] and the latched version of the PCI address/data bus ALWAYS_LATCHED_IAD[31:0]. The translator 454 realigns data to the proper byte alignment, as the source and destination data may be misaligned by one byte.

The write strobe input of the FIFO 452 is connected to the output of an OR gate 456, whose first input receives the signal ICLK and whose other input is connected to the output of a NAND gate 458. One input of the NAND gate 458 receives a signal EI_WRITE_ADDR_FF[0], which is the least significant bit of the write address provided to FIFOs 450 and 452, and the other input receives a signal WRITE_BM_E_I_FIFO. The signal WRITE_BM_E_I_FIFO is asserted high if data registers in the translator block 454 are not empty and the FIFOs 450 and 452 are not full. Data continues to be written to the FIFOs 450 and 452 in an external-to-internal memory move operation until no more data is available or the FIFOs 450 and 452 have filled up.

The write strobe input of the FIFO 450 is connected to the output of an OR gate 460, whose first input receives the signal ICLK and whose second input is connected to the output of a NAND gate 462. One input of the NAND gate 462 receives the signal WRITE_BM_E_I_FIFO, and the other input is connected to the output of a NAND gate 464. The inputs of the NAND gate 464 receive signals SIXTY-FOUR and WRITE_ADDR_FF[0]. For a 32-bit memory data bus MD, only the FIFO 450 is used in the external-to-internal memory move operations, and the write strobe input of the FIFO 450 is asserted low when the signal WRITE_BM_E_I_FIFO is asserted high and the clock signal ICLK is low. For a 64-bit memory data bus MD, both FIFOs are utilized, with the FIFO 450 written when the write address bit EI_WRITE_ADDR_FF[0] is low and the FIFO 452 written when the write address bit EI_WRITE_ADDR_FF[0] is high.

The three-bit write address input of the FIFO 452 receives the value {0, EI_WRITE_ADDR_FF[2:1]}. The three-bit write address input of the FIFO 450 is connected to the output of a 6:3 multiplexor 466, whose select input receives the signal SIXTYFOUR. The 0 input of the multiplexor 466 receives signals EI_WRITE_ADDR_FF[2:0], and the 1 input receives signals {0, EI_WRITE_ADDR_FF[2:1]}.

The write address signals EI_WRITE_ADDR_FF[2:0] are provided by the outputs of a counter 468, which is clocked by the signal ICLK and reset by the signal IRST_. The enable input of the counter 468 receives the signal WRITE_BM_E_I_FIFO, and its load input receives a signal LOAD_CHANNEL. On assertion of the signal LOAD_CHANNEL, which occurs when the PCI bus master 126 begins an external-to-internal memory move operation, the counter 468 is loaded with all zeros. Thereafter, when the signal WRITE_BM_E_I_FIFO is asserted, address bits EI_WRITE_ADDR_FF[2:0] are incremented by 1 on each rising edge of the signal ICLK.

The three-bit read address input of the FIFO 452 receives signals {0, EI_READ_ADDR_FF[2:1]}, while the read address input of the FIFO 450 is connected to the output of a 6:3 multiplexor 470. The select input of the multiplexor 470 receives the signal SIXTYFOUR. The 0 input of the multiplexor 470 receives read address signals EI_READ_ADDR_FF[2:0], while the 1 input receives signals {0, EI_READ_ADDR_FF[2:1]}.

The read address bits EI_READ_ADDR_FF[2:0] are provided by a counter 472, which is also clocked by the signal ICLK and reset by the signal IRST_. The load input of the counter 472 receives the signal LOAD_CHANNEL, and its enable input is connected to the output of an AND gate 474. The inputs of the AND gate 474 receive the external-to-internal memory grant signal BM_E_I_GNT and the signal FIFO_RED. On assertion of the signal LOAD_CHANNEL, the counter 472 is loaded with the value 0. If its enable input is asserted, the counter is incremented by the value {0, SIXTYFOUR, !SIXTY-FOUR} on the rising edge of the signal ICLK.

In the external-to-internal memory move operation, data is first retrieved from external memory and placed into the FIFOs 450 and 452. If a 64-bit memory interface is used, data from the 32-bit PCI data bus PCIAD is alternately placed into FIFOs 450 and 452. Otherwise, only FIFO 450 is used. The FIFO write operation continues until all specified data has been written or the FIFOs 450 and 452 have filled up. Next, FIFO reads are performed to move data from the FIFOs 450 and 452 into the DRAM 116 until the FIFOs 450 and 452 are empty.

Write data WRITE_DATA_TO_DRAM_L[63:0] associated with a write cycle through the PCI bus slave channel 128 are provided by the output of the 128:64 multiplexor 418. The select input of the multiplexor 418 receives a signal WRDT_TS_EN_L_BSWRF, which is asserted low if the write FIFO 132 is granted access to the DRAM 116 by the arbiter 120. The 0 input of the multiplexor 418 is connected to the output of a 36-bit inverter 476. The upper 32 input bits of the inverter 476 are driven by the lower 32 output bits of an AND gate 478. The upper 4 bits of the AND gate 478 output correspond to bits 4–7 of the DRAM byte enable signals BYTEN_TO_DRAM_L[7:0]. One input of the AND gate 478 receives the signal SIXTYFOUR repeated 36 times, while the other input is connected to the 36-bit data output of a FIFO 480. The lower 32 input bits of the inverter 476 is connected to the lower 32 output bits of a FIFO 482. The upper 4 output bits of the FIFO 482 correspond to bits 0–3 of the DRAM byte enable signals BYTEN_TO_DRAM_L[7:0]. The FIFOs 480 and 482 are also 36 bits wide and 8 words deep. The FIFOs 480 and 482 make up the write FIFO 132 associated with the PCI bus slave channel 128.

The upper 4 input bits of the FIFOs 480 and 482 receive latched versions of the PCI byte enable signals PCI_BS_FIFO_WRITE_BYTEN[3:0], and the lower 32 input bits of the FIFOs 480 and 482 receive the latched version of the PCI data PCI_BS_FIFO_WRITE_DATA[31:0]. The write strobe input of the FIFO 480 is connected to the output of an OR gate 484, whose first input receives the signal ICLK and whose second input is connected to the output of a NAND gate 486. The first input of the NAND gate 486 receives FIFO write address bit BS_WRITE_ADDR_FF[0], and the second input receives a write-bus-slave-FIFO signal PCI_BS_WR_FIFO. The signal PCI_BS_WR_FIFO is asserted high if a DRAM write cycle is generated on the PCI local bus 102, the bus slave write FIFO 132 is empty, and the DRAM 116 is not currently granted to the write FIFO 132 by the DRAM arbiter 120. Once the signal PCI_BS_WR_FIFO is asserted, it remains so until the last transfer has completed or the write FIFO 132 becomes full.

The write strobe input of the FIFO 482 is connected to the output of an OR gate 488, whose first input receives the signal ICLK and whose second input is connected to the output of a NAND gate 490. One input of the NAND gate 490 receives the signal PCI_BS_WR_FIFO, and the other input is connected to the output of a NAND gate 492. The inputs of the NAND gate 492 receive the signals SIXTY-FOUR and BS_WRITE_ADDR_FF[0].

Write address bits BS_WRITE_ADDR_FF[2:0] and read address bits BS_READ_ADDR_FF[2:0] for FIFOs 480 and 482 are generated in the same manner as for FIFOs 450 and 452, except that the load inputs of the counters receive signals PCI_BS_WRIT_FIFO_GO. The signal PCI_BS_WRIT_FIFO_GO is asserted high when a DRAM write cycle is detected on a PCI local bus 102, the bus slave write FIFO 132 is empty, and the write FIFO 132 has not been granted access to the DRAM 116. The signal PCI_BS_WRIT_FIFO_GO is used to trigger assertion of the signal PCI_BS_WR_FIFO described above. The enable input signal for the counter generating signals BS_WRITE_ADDR_FF[2:0] is PCI_BS_WR_FIFO. The enable input for the counter generating read address bits BS_READ_ADDR_FF[2:0] is the AND of the FIFO_READ signal and the bus slave write FIFO grant signal PCI_BS_WR_FIFO_GNT.

On PCI writes to the PCI bus slave channel 128, data are first loaded into the FIFOs 480 and 482. Again, if a 64-bit MD bus is used, then the 32-bit data bus is alternately loaded into the FIFOs 480 and 482. Otherwise, if a 32-bit MD bus is used, then only FIFO 482 is used. Next, once the write FIFO 132 is granted access to the DRAM 116, data is read from the FIFOs 480 and 482 and written to the DRAM 116 until all data have been read.

The DRAM byte enable signals BYTEN_TO_DRAM_L[7:0]are provided by the output of 16:8 multiplexors 500, 504, 508 and 512. The 1 input of the multiplexor 500 is tristated, while the 0 input is connected to the output of an 8-bit inverter 502. The input of the inverter 502 receives the upper 4 output bits of the AND gate 478 and the upper 4 output bits of the FIFO 482. The select input of the multiplexor 500 receives the signal WRDT_TS_EN_L_BSWRF.

For external-to-internal memory move operations, the byte enable signals BYTEN_TO_DRAM_L[7:0] are provided by the 16:8 multiplexor 504, whose 1 input is also tristated. The 0 input of the multiplexor 504 is connected to the output of an 8-bit inverter 506, whose input is connected to the upper 4 output bits of the AND gate 448 and the upper 4 output bits of the FIFO 450. The select input of the multiplexor 504 is connected to the signal WRDT_TS_EN_L_BMEI.

For internal-to-internal memory move operations, the byte enable signals BYTEN_TO_DRAM_L[7:0] are provided by the output of the multiplexor 508. The 1 input of the multiplexor 508 is tristated, and its 0 input is connected to the output of an 8-bit inverter 510. The input of the inverter 510 receives signals BM_I_I_BYTEN_EN[7:0]. The values of the signals BM_I_I_BYTEN_EN[7:0] depend on the state of signals UPPER_20_ZERO and transfer byte count signals BM_BYTE_COUNT_FF[3:0]. The initial value of signals BM_BYTE_COUNT_FF[23:0] is loaded in from the upper 24 bits of the CDB control register specifying the transfer byte length of the programmed operation. The signal UPPER_20_ZERO is asserted high if byte count signals BM_BYTE_COUNT_FF[23:4] are all low. If the signal UPPER_20_ZERO is deasserted low, then the byte enable signals BM_I_I_BYTEN_EN[7:0] are all driven high. If the signal UPPER_20_ZERO is equal to 1, the signals BM_BYTE_COUNT_FF[3:0] containing values 0–F provide the following values on signals BM_I_I_BYTEN_EN[7:0], respectively: 0b00000000, 0b00000001, 0b00000011, 0b00000111, 0b00001111, 0b00011111, 0b00111111, 0b01111111, 0b11111111, 0b11111111, 0b11111111, 0b11111111, 0b11111111, 0b11111111, 0b11111111, 0b11111111. The count bits BM_BYTE_COUNT_FF[23:0] are decremented from their initial value down to the value 0, which indicates that all data has been transferred.

For zero fill operations, the byte enable signals BYTEN_TO_DRAM_L[7:0] are provided by the output of the multiplexor 512, whose 1 input is tristated. The 0 input of the multiplexor 512 is connected to the output of an 8-bit inverter 514, whose input receives signals ZF_BYTEN_EN[7:0]. The signals ZF_BYTEN_EN[3], ZF_BYTEN_EN[2], ZF_BYTEN_EN[1] and ZF_BYTEN_EN[0] are asserted high if the value of the signals BM_BYTE_COUNT_FF[23:0] is greater than or equal to 4, 3, 2 and 1, respectively. Similarly, the signals ZF_BYTEN_EN[7], ZF_BYTEN_EN[6], ZF_BYTEN_EN[5] and ZF_BYTEN_EN[4] are asserted if the value of the signals BM_BYTE_COUNT_FF[23:0] is greater than or equal to 8, 7, 6 and 5, respectively, and if the signal SIXTYFOUR is asserted high. The number of bytes of the XOR buffer 134 that are written with zeros thus depend on the transfer length specified in the CDB. The zero fill operations stops once all the bytes indicated by the transfer byte length of the CDB control register has been filled with zeros. The select input of the multiplexor 512 receives the signal WRDT_TS_EN_L_BMZF.

Thus for write operations in which data is retrieved from an external source, i.e., the external-to-internal memory move operation and bus slave write operation, the byte enable signals BYTEN_TO_DRAM_L[7:0] are determined from the PCI byte enable signals. For the zero fill operation and the internal-to-internal memory move operation, the byte enable signals BYTEN_TO_DRAM_L[7:0] are determined from the specified transfer length.

The address bus MA is driven by the DRAM interface 118 during a memory access cycle. The memory address bus MA is driven by multiplexed address signals LOCAL_DRAM_ADDR_FF[26:2], which are in turn loaded from the inverted state of address signals START_ADDRESS_TO_DRAM_L[26:2]. The inverted state of signals START_ADDRESS_TO_DRAM_L[26:2] are multiplexed onto the address bus MA to provide the row and column addresses to the DRAM 116. Address counters 530, 532, 534 and 536 are associated with the internal-to-internal memory write operation, external-to-internal memory write operation, bus slave channel write operation, and other bus master write operation, respectively.

The counter 530 is loaded when the signal CLEAR_CHANNEL is asserted, which occurs for one ICLK period in response to an internal-to-internal memory write operation starting. The counter 530 is loaded with the value represented by signals I_I_DEST_ADDR[26:2], which contain the destination address specified in the CDB for the internal-to-internal memory move operation.

The counter 532 is loaded with the value on signals E_I_DEST_ADDR[26:2] when the signal LOAD_CHANNEL is asserted, which occurs when the PCI bus master 126 begins an external-to-internal memory move operation. The signals E_I_DEST_ADDR[26:2] represent the destination address specified in the external-to-internal memory move CDB.

The counter 534 is loaded with the value PCI_BS_ADDRESS[26:2], which is a latched version of the PCI address bus PCIAD, when the signal PCI_BS_WRIT_FIFO_GO is asserted. The counter 536 is loaded with the value on signals CUR_SRCE_ADDR[26:2] when the output of a 4-input OR gate 537 is asserted. The signals CUR_SRCE_ADDR[26:2] represent the source address specified in the CDB of the current operation. The inputs of the OR gate 537 receive a signal LOAD_ADDRSS_BMZF, asserted high at the start of a zero-fill operation, a signal LOAD_ADDRESS_BMZC, asserted high at the start of a zero-check operation, a signal LOAD_ADDRESS_BM_II, asserted high at the start of an internal-to-internal memory read operation, and a signal LOAD_ADDRESS_BM_IE, asserted at the start of an internal-to-external memory move operation.

The counters 530–536 are incremented with each write access to the DRAM 116. For the counters 530, 532 and 534, the address is incremented with each read of FIFOs 424, 426; 450, 452; and 480, 482, respectively. For the zero fill operation, the counter 536 is incremented when the signal FIFO_READ is asserted and the zero fill block 136 has been granted access to the DRAM 116.

The outputs of the counters 530, 532, 534 and 536 are provided to the inputs of inverters 546, 548, 550 and 552, respectively, whose outputs are in turn provided to the 0 inputs of the multiplexors 538, 540, 542 and 544, respectively. The 1 inputs of the multiplexors are tristated. The select inputs of the multiplexors 538–544 receive signals WRDT_TS_EN_L_BMIIW, WRDT_TS_EN_L_BMEI, WRDT_TS_EN_L_BSWRF, and RA_TS_EN_L_BMADR, respectively. The signal RA_TS_EN_L_BMADR is asserted low if one of the following requests is granted: zero check operation, internal-to-internal read operation, zero fill operation, and internal-to-external memory move operation. The outputs of the multiplexors 538–544 drive address signals START_ADDRESS_TO_DRAM_L[26:2].

The address signals START_ADDRESS_TO_DRAM_L[26:2] are driven to the input of an inverter 554, whose output is connected to the load data input of a counter 556. The counter 556 is loaded with the inverted state of the signals START_ADDRESS_TO_DRAM_L[26:2] when the signal LOAD_ADR driven by the OR gate 304 (FIG. 5) is asserted high. The counter 556 is incremented on the rising edge of the signal ICLK if the signal INC_LCAL_DRAM_ADDR (driven by the DRAM controller state machine 168) is asserted high. The counter 556 is incremented by the value 2 if a 64-bit MD bus is used and by 1 if a 32-bit MD bus is used. The counter 556 drives output signals LOCAL_DRAM_ADDR_FF[26:2], and is reset on the negative edge of the signal IRST_. Thus, the signals START_ADDRESS_TO_DRAM_L[26:2] specify the starting address of the address signals LOCAL_DRAM_ADDR_FF[26:2], with both sets of address signals being incremented with each transfer of data to the DRAM 116. The address signals LOCAL_DRAM_ADDR_FF[26:2] are separately incremented by the signal INC_LCAL_DRAM_ADR to provide for proper timing.

The address signals LOCAL_DRAM_ADDR_FF[26:2] are multiplexed onto the memory address bus MA according to Table 2.

TABLE 2

| ROW_ADR | MODE_RC | SIXTYFOUR | MA[11:0] |
| --- | --- | --- | --- |
| 0 | 0 | 0 | LOCAL_DRAM_ADD_FF[10:2] |
| 1 | 0 | 0 | LOCAL_DRAM_ADDR_FF[22:11] |
| 0 | 0 | 1 | LOCAL_DRAM_ADDR_FF[11:3] |
| 1 | 0 | 1 | LOCAL_DRAM_ADDR_FF[23:12] |
| 0 | 1 | 0 | LOCAL_DRAM_ADDR_FF[11:2] |
| 1 | 1 | 0 | LOCAL_DRAM_ADDR_FF[23:12] |
| 0 | 1 | 1 | LOCAL_DRAM_ADDR_FF[12:3] |
| 1 | 1 | 1 | LOCAL_DRAM_ADDR_FF[23:13] |

The signal ROW_ADR is asserted high by the DRAM controller state machine 168 to select row addressing. The signal SIXTYFOUR indicates if a 64-bit or 32-bit memory data interface is used. The signal MODE_RC indicates if the addressing scheme comprises an 11-bit row address and 10-bit column address (MODE_RC high) or 12-bit row address and 9-bit column address (MODE_RC low). The signals LOCAL_DRAM_ADDR_FF[Y:X] are appended with zeros where necessary at the beginning to make up the 12-bit memory address bus MA[11:0]. The signal MODE_RC can be set differently for each bank of memory in the multi-bank configurations. Thus, for example, bank 1 could be set to 12-bit row/9-bit column addressing while bank 2 could be set to 11-bit row/10-bit column addressing. Note that for the case in which a 32-bit memory data bus MD is used (the signal SIXTYFOUR is low), if the signal MODE_RC is set high, a 12-bit row address is used instead of an 11-bit row address for the cases where the DRAMs used are organized with 12-bit row/9-bit column addressing instead of 11-bit row/10-bit column addressing.

In the preferred embodiment, the DRAM 116 is configurable to multi-banks if 512Kx8 or 2Mx8 DRAM chips are used. For the 512Kx8 configuration, address bits LOCAL_DRAM_ADDR_FF[23:22] select one of four possible banks. For the 2Mx8 configuration, address bits LOCAL_DRAM_ADDR_FF[25:24] select one of four possible banks.

In the various DRAM configurations, address bit LOCAL_DRAM_ADDR_FF[26] or address bit LOCAL_DRAM_ADDR_FF[24] is not used in the actual physical addressing of the DRAM 116 when double-mapping is used. As explained earlier, bit 26 constitutes the most significant bit in certain configurations, while bit 24 constitutes the most significant bit in other configurations. By varying bit 26 or 24 between the high and low state, a read-modify-write XOR operation or a normal write operation can be specified to the same physical address location in the DRAM 116.

Figure 8:
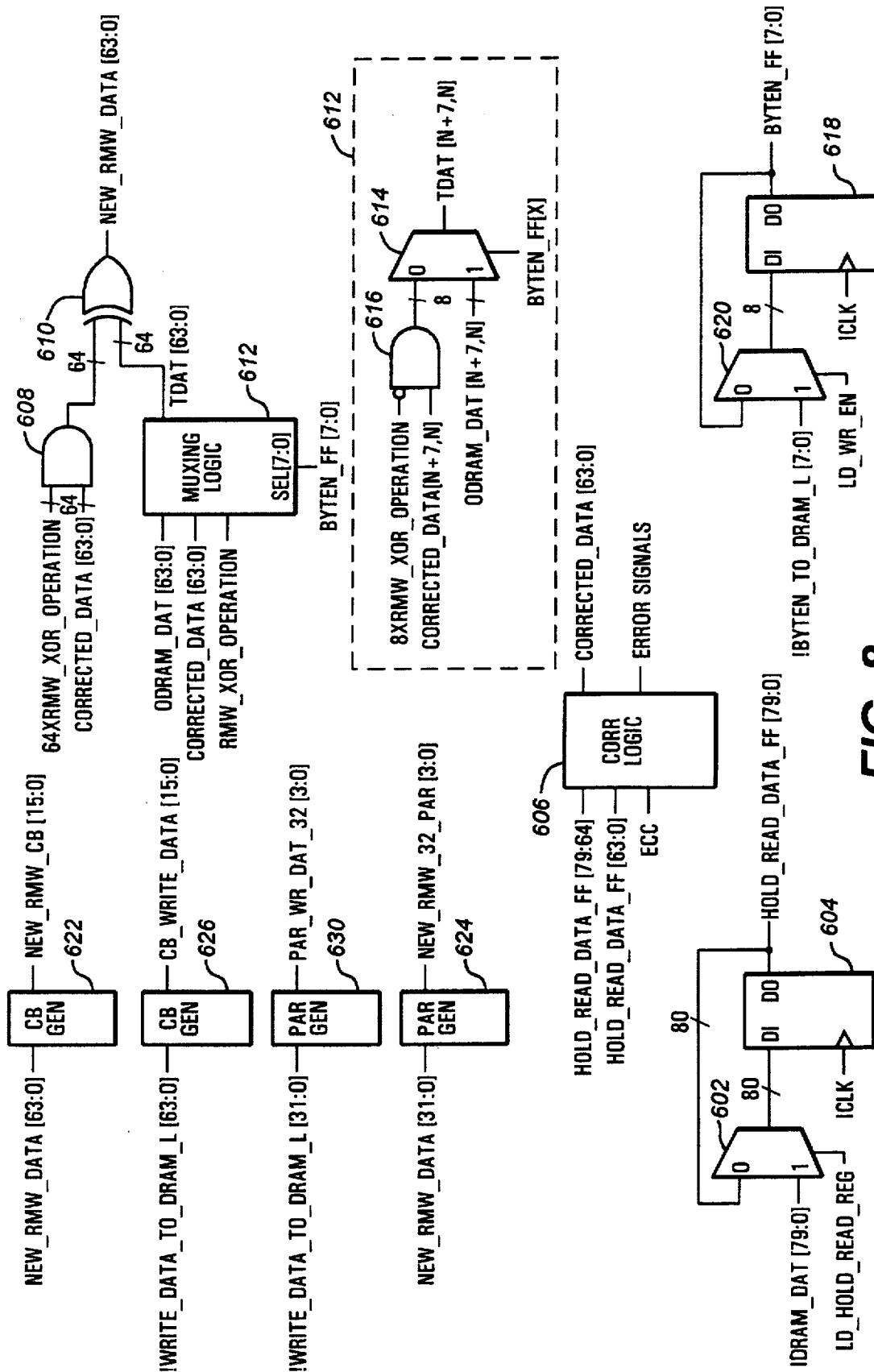
FIG. 8 is a schematic diagram of logic for generating various check bit information, parity bit information and read-modify-write data.

Referring now to FIG. 8, a schematic diagram is shown of logic for generating ECC check bits, parity bits, and read-modify-write data. The data outputs from the DRAM 116 are received as signals IDRAM_DAT[79:0] in the DRAM interface 118. When ECC mode is enabled, the upper 16 bits of the DRAM data path correspond to the ECC check bits. It is noted that, in the preferred embodiment, when a 64-bit memory data path is used, ECC mode is enabled. If the memory data bus MD is 32 bits wide and parity mode is enabled, then DRAM data bits 32–35 are the four parity bits. For the 32-bit MD bus configuration, ECC mode can also be enabled.

The DRAM signals IDRAM_DAT[79:0] are provided to the 1 input of a 160:80 multiplexor 602, whose select input receives the signal LD_HOLD_READ_REG asserted high by the DRAM controller state machine 168 during the read portion of the read-modify-write cycle. The output of the multiplexor 602 is provided to the data input of a register 604, which is clocked on the rising edge of the signal ICLK. The data output of the register 604 provides signals HOLD_READ_DATA_FF[79:0], which are routed back to the 0 input of the multiplexor 602. The latched DRAM check bits HOLD_READ_DATA_FF[79:64] and the latched DRAM read data HOLD_READ_DATA_FF[63:0] are provided to correction logic 606, which also receives the ECC enable signal ECC. If the signal ECC is asserted, the correction logic 606 generates check bits based on the latched read data HOLD_READ_DATA_FF[63:0], and compares the generated check bits with the latched DRAM check bits HOLD_READ_DATA_FF[79:64] to determine if an error occurred. The ECC algorithm can correct any number of bits in a byte lane. The data output of the error correction logic are signals CORRECTED_DATA[63:0], as well as a signal NO_ERROR and other error signals indicating the byte in which the data error occurred if any.

The signals CORRECTED_DATA[63:0] are provided to one input of an AND gate 608, whose other input receives the signal RMW_XOR_OPERATION repeated 64 times. The sixty-four bit output of the AND gate 608 is provided to one input of a 64-bit exclusive OR gate 610, whose other input is connected to the output of multiplexing logic 612. The multiplexing logic 612 is implemented with 8 sets of a 16:8 multiplexor 614 and an AND gate 616. The output of the multiplexor 614 provides signals TDAT[N+7:N], N=0, 8, 16, 24, 32, 40, 48 and 56. The select input of the multiplexor 614 receives a signal BYTEN_FF[X], X=0–7. The 0 input of the multiplexor 614 is connected to the 8-bit output of the AND gate 616, whose first input receives the inverted state of the signal RMW_XOR_OPERATION repeated 8 times, and whose other input receives signals CORRECTED_DATA[N+7,N]. The 1 input of the multiplexor 614 receives the signals ODRAM_DAT[N+7:N], which are provided by the register 400. Thus, if a byte is selected, then the signals ODRAM_DAT[N+7:N] are driven onto signals TDAT[N+7:N]. In read-modify-write XOR operations, the read and write data are XORed. In normal read-modify-write operations, the signals ODRAM_DAT[N+7:N] are XORed with zeros to pass the state of the write data signals ODRAM_DAT[N+7:N] directly to the signals NEW_RMW_DATA[N+7:N] if the byte is selected.

If the particular byte is not selected, that is, the signal BYTEN_FF[X] is low, then the signals CORRECTED_DATA[N+7:N] are driven onto the signals TDAT[N+7:N] if a read-modify-write cycle other than a read-modify-write XOR operation is in progress. In normal read-modify-write cycles, the signals CORRECTED_DATA[N+7:N] constitute the corrected read data corresponding to the unselected byte that is to be written back to the DRAM 116. For read-modify-write XOR cycles, the byte TDAT[N+7:N] is driven to all zeros if the corresponding byte enable signal BYTEN_FF[X] is deasserted. The zeros are XORed with the corresponding byte CORRECTED_DATA[N+7:N] to leave the byte CORRECTED_DATA[N+7:N] unchanged.

The signals BYTEN_FF[7:0] are provided by an 8-bit register 618, which is clocked on the rising edge of the signal ICLK. The data input of the register 618 is driven by the output of a 16:8 multiplexor 620, which is selected by the signal LD_WR_EN. The 0 input of the multiplexor 620 receives the signals BYTEN_FF[7:0], and the 1 input receives the inverted state of the DRAM byte enable signals BYTEN_TO_DRAM_L[7:0].

The check bits generated during a read-modify-write cycle are produced by a check bit generator 622. The input of the check bit generator 622 receives signals NEW_RMW_DATA[63:0] provided by the XOR gate. The output of the check bit generator 622 drives check bit signals NEW_RMW_CB[15:0]. The parity bits for a read-modify-write cycle are generated by a parity generator 624. The input of the parity generator 624 receives signals NEW_RMW_DATA[31:0], and the output drives parity signals NEW_RMW_32_PAR[3:0].

For a normal write operation, the check bits are generated by a check bit generator 626. The input of the check bit generator 626 receives the inverted state of the write data signals WRITE_DATA_TO_DRAM_L[63:0]. The output of the check bit generator 626 provides check bits CB_WRITE_DATA[15:0]. The parity bits for a normal write cycle are generated by the output of a parity bit generator 630, which produces signals PAR_WR_DAT_32[3:0]. The input of the parity generator 630 receives the inverted state of the data signals WRITE_DATA_TO_DRAM_L[31:0]. The check bits NEW_RMW_CB[15:0] and CB_WRITE_DATA[15:0], parity bits NEW_RMW_32_PAR[3:0] and PAR_WR_DAT_32[3:0], and the data bits NEW_RMW_DATA[63:0] and WRITE_DATA_TO_DRAM_L[63:0] are multiplexed by the multiplexor 402 into the register 400.

Thus, circuitry for performing hardware assisted XOR operations has been described to generate parity bits for a disk array system. The circuitry includes a controller that acts as an interface between a PCI bus and a DRAM that includes a write-posting cache portion and an XOR buffer portion. The DRAM has a maximum data storage capacity, and the controller is allocated an address space that is twice the maximum storage capacity of the DRAM. The address space is divided into two portions, a normal address range and an XOR address range. A write to the normal address range produces a normal write cycle to the DRAM, while a write to the XOR address range generates a read-modify-write XOR cycle to the DRAM. In the read-modify-write XOR cycles, the read data are XORed with the write data. Selected data are cumulatively XORed to generate new parity information.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A memory controller for controlling operations of a memory device, wherein the memory controller is allocated an address space having a first address range and a second address range, and wherein write commands containing addresses and data are issued to the memory controller to perform write operations to the memory device, the memory controller comprising:

receiving logic for receiving a write command;

mapping logic responsive to the write command address of said received write command for mapping addresses in the first address range and addresses in the second address range to a physical region in the memory device; and read-modify-write logic coupled to said receiving logic and said mapping logic for generating a read-modify-write cycle to the memory device if the received write command address is in the second address range, wherein said read-modify-write cycle reads data from the memory device address associated with the received write command address, performs an exclusive OR operation of said read data with the received write command data to generate exclusive OR data, and writes said exclusive-OR data back to the memory device address associated with the received write command address.

2. The memory controller of claim 1, wherein addresses in the first address range and addresses in the second address range are mapped to the same physical region in the memory device.

3. The memory controller of claim 2, wherein the memory controller address space is represented by a plurality of address bits, said address bits having a first number of bits representing the physical locations in the memory device, and wherein one of said address bits other than said first number of address bits determine if an address is in the first address range or the second address range.

4. The memory controller of claim 1, wherein addresses in the first address range and addresses in the second address range are mapped to different physical regions in the memory device.

5. The memory controller of claim 1, further comprising:

write logic coupled to said receiving logic and said read-modify-write logic generating a normal write cycle if the received write command address is in the first address range, wherein the received write command data is written to the memory device address associated with the received write command address.

6. The memory controller of claim 1, wherein each write command further contains a transfer length value to specify the amount of write data to be transferred, and wherein said read-modify-write logic performs read-modify-write cycles starting at the write command address until the amount of data specified by said transfer length value has been transferred.

7. The memory controller of claim 1, the memory device being used for general write operations and parity operations, wherein the memory device includes an XOR buffer to which write operations in the second address range are directed, said XOR buffer having a storage capacity that is programmable to different values.

8. A disk controller board for controlling accesses to a hard disk drive subsystem from a host computer, comprising:

a bus;

a hard disk controller coupled between said bus and the hard disk drive subsystem for transferring data between said bus and the hard disk drive subsystem;

a memory device;

a memory controller coupled between said bus and said memory device, wherein said memory controller is allocated an address space having a first address range and a second address range; and a local processor coupled to said bus, wherein at least one of said hard disk controller or said local processor issues write commands having addresses and data to said memory controller to perform write operations, wherein said memory controller includes:

receiving logic coupled to said bus and receiving a write command;

read-modify-write logic coupled to said bus and responsive to said write command address of said received write command for mapping addresses in said first address range and addresses in said second address range to a physical region in said memory device; and read-modify-write logic coupled to said receiving means and said mapping means for generating a read-modify-write cycle to said memory device if the received write command address is in said second address range, wherein said read-modify-write cycle reads data from said memory device address associated with the received write command address, performs an exclusive OR operation of said read data with the received write command data to generate exclusive OR data, and writes said exclusive-OR data back to said memory device address associated with the received write command address.

9. The disk controller board of claim 8, wherein addresses in said first address range and addresses in said second address range are mapped to the same physical range in said memory device.

10. The disk controller board of claim 9, wherein said memory controller address space is represented by a plurality of address bits, said address bits having a first number of bits representing the physical locations in said memory device, and wherein one of said address bits other than said first number of address bits determine if an address is in said first address range or said second address range.

11. The disk controller board of claim 8, wherein addresses in said first address range and addresses in said second address range are mapped to different physical ranges in said memory device.

12. The disk controller board of claim 8, wherein said memory controller further includes write logic coupled to said receiving logic and said mapping logic for generating a normal write cycle if the received write command address is in said first address range, wherein the received write command data is written to said memory device address associated with the received write command address.

13. The disk controller board of claim 8, wherein the hard disk drive subsystem implements a fault tolerant scheme which utilizes parity information to correct errors in related data stored in the hard disk drive subsystem, said related data being divided into at least two portions, wherein said parity information is the exclusive OR of said at least two portions of said related data.

14. The disk controller board of claim 13, wherein if a write having new data is directed to one portion of original related data, new parity information is generated by issuing a new write command with said new data and with an address in said second address range and sequentially writing the remaining at least one portion of said original related data to said memory controller at said new write command address.

15. The disk controller board of claim 13, wherein if a write having new data is directed to one portion of original related data, new parity information is generated by issuing a new write command with said new data and with an address in said second address range and sequentially writing said one portion of said original related data and corresponding original parity information to said memory controller at said new write command address.

16. The disk controller board of claim 13, wherein if writes having new data are directed to said at least two portions of related data, new parity information is generated by sequentially issuing new write commands with said new data and with an address in said second address range to said memory controller.

17. The disk controller board of claim 13, wherein if an error occurs in one portion of original related data, said erroneous portion can be regenerated by sequentially writing the remaining at least one portion of said original related data and corresponding original parity information to said memory controller at an address in said second address range.

18. The disk controller board of claims 14, 15, 16 or 17, wherein said local processor issues a zero-fill command to said memory controller to cause a region in said memory device to be filled with zeros before the writing operations in said second address range are performed.

19. The disk controller board of claim 8, wherein each write command issued to said memory controller further contains a transfer length value to specify the amount of data to be written, and wherein said read-modify-write logic performs read-modify-write cycles starting at the write command address until the amount of data specified by said transfer length value has been transferred.

20. The disk controller board of claim 8, the memory device being used for general write operations and parity operations, wherein said memory device includes an XOR buffer to which the write operations in said second address range are directed, said XOR buffer being programmable to various different sizes.

21. The disk controller board of claim 8, wherein said memory device further includes a write posting cache to post write data of write requests from the host computer to the hard disk drive subsystem.

22. A method of performing read-modify-write operations in a memory controller, the memory controller for controlling operations to a memory device, the memory controller being allocated an address space having a first address range and a second address range, the method comprising the steps of:

mapping addresses in the first address range and addresses in the second address range to a physical region in the memory device;

writing data to the memory controller at a destination address;

decoding said destination address to determine if it is in the first address range or second address range; and the memory controller generating a read-modify-write cycle in response to said data writing step if said destination address is in the second address range, wherein each read-modify-write cycle reads data from the memory device address associated with said destination address, performs an exclusive OR operation of said read data with said write data to generate exclusive OR data, and writes said exclusive OR data back to the memory device address associated with said destination address.

23. The method of claim 22, wherein addresses in the first address range and addresses in the second address range are mapped to the same physical region in the memory device.

24. The method of claim 23, wherein the memory controller address space is represented by a plurality of address bits, said address bits having a first number of bits representing the physical locations in the memory device, and wherein one of said address bits other than said first number of address bits determine if an address is in the first address range or the second address range.

25. The method of claim 22, wherein addresses in the first address range and addresses in the second address range are mapped to different physical regions in the memory device.

26. The method of claim 22, wherein the memory controller and memory device are located in a disk controller board for controlling operations to a hard disk drive subsystem, wherein said hard disk drive subsystem implements a fault tolerant scheme which utilizes parity information to correct errors in related data stored in said hard disk drive subsystem, said related data being divided into at least two portions, wherein said parity information is the exclusive OR of said at least two portions of said related data.

27. The method of claim 26, wherein if a write having new data is directed to one portion of original related data, the method further comprising the steps of:

generating new parity information by writing said new data to the memory controller at a write address in the second address range; and sequentially writing the remaining at least one portion of said original related data to the memory controller at said new write address.

28. The method of claim 26, wherein if a write having new data is directed to one portion of original related data, the method further comprising the steps of:

generating new parity information by writing said new data to the memory controller at a write address in the second address range; and sequentially writing said one portion of said original related data and corresponding original parity information to the memory controller at said new write address.

29. The method of claim 26, wherein if writes having new data are directed to said at least two portions of related data, the method further comprising the step of:

generating new parity information by sequentially writing said new data to the memory controller at a write address in the second address range.

30. The method of claim 26, wherein if an error occurs in one portion of original related data, the method further comprising the step of:

regenerating said erroneous portion by sequentially writing the remaining at least one portion of said original related data and corresponding original parity information to the memory controller at an address in the second address range.

31. The method of claims 27, 28, 29 or 30, further comprising the step of:

filling zeros in a region in the memory device before the writing operations in the second address range are performed.

32. The method of claim 22, wherein a transfer length is specified with said writing step, said transfer length specifying the amount of data to be transferred, wherein said writing step transfers the specified amount of write data into the memory device.

33. The method of claim 22, further comprising the step of:

the memory controller generating a normal write cycle in response to said writing step if said destination address is in the first address range, said normal write cycle writing said write data into the memory device address associated with said destination address.

* * * * *